United States Patent
Weibel et al.

(10) Patent No.: US 9,789,655 B1
(45) Date of Patent: Oct. 17, 2017

(54) METHODS FOR MOLD RELEASE OF BODY-MOUNTABLE DEVICES INCLUDING MICROELECTRONICS

(71) Applicant: Verily Life Sciences LLC, Mountain View, CA (US)

(72) Inventors: Douglas Benjamin Weibel, Madison, WI (US); Daniel Patrick Barrows, Sunnyvale, CA (US); Jeffrey George Linhardt, Pleasanton, CA (US)

(73) Assignee: VERILY LIFE SCIENCES LLC, Mountain View, CA (US)

( * ) Notice: Subject to any disclaimer, the term of this patent is extended or adjusted under 35 U.S.C. 154(b) by 564 days.

(21) Appl. No.: 14/210,999

(22) Filed: Mar. 14, 2014

(51) Int. Cl.
*B29C 70/68* (2006.01)
*B29D 11/00* (2006.01)
*B29C 37/00* (2006.01)

(52) U.S. Cl.
CPC .... *B29D 11/00192* (2013.01); *B29C 37/0067* (2013.01); *B29C 70/68* (2013.01); *B29C 70/685* (2013.01)

(58) Field of Classification Search
None
See application file for complete search history.

(56) References Cited

U.S. PATENT DOCUMENTS

| | | |
|---|---|---|
| 3,958,560 A | 5/1976 | March |
| 4,014,321 A | 3/1977 | March |
| 4,055,378 A | 10/1977 | Feneberg et al. |
| 4,122,942 A | 10/1978 | Wolfson |
| 4,136,250 A | 1/1979 | Mueller et al. |
| 4,143,949 A | 3/1979 | Chen |
| 4,153,641 A | 5/1979 | Deichert et al. |
| 4,214,014 A | 7/1980 | Hofer et al. |
| 4,309,085 A | 1/1982 | Morrison |
| 4,312,575 A | 1/1982 | Peyman et al. |

(Continued)

FOREIGN PATENT DOCUMENTS

| | | | |
|---|---|---|---|
| EP | 0369942 | * | 5/1990 |
| EP | 0686372 | | 12/1995 |

(Continued)

OTHER PUBLICATIONS

Bionic contact lens 'to project emails before eyes,' http://www.kurzweilai.netforums/topic/bionic-contact-lens-to-project-emails-before-eyes, Last accessed Mar. 14, 2012, 2 pages.

(Continued)

*Primary Examiner* — Edmund Lee
(74) *Attorney, Agent, or Firm* — McDonnell Boehnen Hulbert & Berghoff

(57) ABSTRACT

A body-mountable device may include a first polymer layer, a second polymer layer, and a structure that includes a sensor between the first and second polymer layers. Fabricating the body-mountable device may involve providing a respective surface layer on each of one or more molding pieces, forming a first polymer layer, positioning the structure on the first polymer layer and then forming, between molding pieces, the second polymer layer over the structure positioned on the first polymer layer. The surface layer of each molding piece may facilitate release of the polymer layer or fabricated body-mountable device without disruption to the embedded structure.

10 Claims, 13 Drawing Sheets

(56) References Cited

U.S. PATENT DOCUMENTS

| | | | |
|---|---|---|---|
| 4,401,371 A | 8/1983 | Neefe | |
| 4,463,149 A | 7/1984 | Ellis | |
| 4,555,372 A | 11/1985 | Kunzler et al. | |
| 4,604,479 A | 8/1986 | Ellis | |
| 4,632,844 A | 12/1986 | Yanagihara et al. | |
| 4,686,267 A | 8/1987 | Ellis et al. | |
| 4,740,533 A | 4/1988 | Su et al. | |
| 4,826,936 A | 5/1989 | Ellis | |
| 4,944,584 A * | 7/1990 | Maeda | B29D 11/00413 264/1.7 |
| 4,996,275 A | 2/1991 | Ellis et al. | |
| 4,997,770 A | 3/1991 | Giles et al. | |
| 5,032,658 A | 7/1991 | Baron et al. | |
| 5,034,461 A | 7/1991 | Lai et al. | |
| 5,070,215 A | 12/1991 | Bambury et al. | |
| 5,124,107 A * | 6/1992 | Schmid | A61B 5/04087 264/255 |
| 5,135,297 A | 8/1992 | Valint et al. | |
| 5,177,165 A | 1/1993 | Valint et al. | |
| 5,177,168 A | 1/1993 | Baron et al. | |
| 5,219,965 A | 6/1993 | Valint et al. | |
| 5,260,000 A | 11/1993 | Nandu et al. | |
| 5,271,875 A * | 12/1993 | Appleton | B29C 33/0038 249/160 |
| 5,310,779 A | 5/1994 | Lai | |
| 5,321,108 A | 6/1994 | Kunzler et al. | |
| 5,326,584 A | 7/1994 | Kamel et al. | |
| 5,336,797 A | 8/1994 | McGee et al. | |
| 5,346,976 A | 9/1994 | Ellis et al. | |
| 5,358,995 A | 10/1994 | Lai et al. | |
| 5,364,918 A | 11/1994 | Valint et al. | |
| 5,387,662 A | 2/1995 | Kunzler et al. | |
| 5,449,729 A | 9/1995 | Lai | |
| 5,472,436 A | 12/1995 | Fremstad | |
| 5,512,205 A | 4/1996 | Lai | |
| 5,585,871 A | 12/1996 | Linden | |
| 5,610,252 A | 3/1997 | Bambury et al. | |
| 5,616,757 A | 4/1997 | Bambury et al. | |
| 5,682,210 A | 10/1997 | Weirich | |
| 5,708,094 A | 1/1998 | Lai et al. | |
| 5,710,302 A | 1/1998 | Kunzler et al. | |
| 5,714,557 A | 2/1998 | Kunzler et al. | |
| 5,726,733 A * | 3/1998 | Lai | G02B 1/043 351/159.33 |
| 5,760,100 A | 6/1998 | Nicolson et al. | |
| 5,908,906 A | 6/1999 | Kunzler et al. | |
| 5,981,669 A | 11/1999 | Valint et al. | |
| 6,087,941 A | 7/2000 | Ferraz et al. | |
| 6,131,580 A | 10/2000 | Ratner et al. | |
| 6,193,369 B1 | 2/2001 | Valint et al. | |
| 6,200,626 B1 | 3/2001 | Grobe et al. | |
| 6,213,604 B1 | 4/2001 | Valint et al. | |
| 6,217,171 B1 * | 4/2001 | Auten | A61F 2/145 351/159.02 |
| 6,312,393 B1 | 11/2001 | Abreu | |
| 6,348,507 B1 | 2/2002 | Heiler et al. | |
| 6,366,794 B1 | 4/2002 | Moussy et al. | |
| 6,423,001 B1 | 7/2002 | Abreu | |
| 6,428,839 B1 | 8/2002 | Kunzler et al. | |
| 6,431,705 B1 | 8/2002 | Linden | |
| 6,440,571 B1 | 8/2002 | Valint et al. | |
| 6,450,642 B1 | 9/2002 | Jethmalani et al. | |
| 6,532,298 B1 | 3/2003 | Cambier et al. | |
| 6,550,915 B1 | 4/2003 | Grobe, III | |
| 6,570,386 B2 | 5/2003 | Goldstein | |
| 6,579,235 B1 | 6/2003 | Abita et al. | |
| 6,599,559 B1 | 7/2003 | McGee et al. | |
| 6,614,408 B1 | 9/2003 | Mann | |
| 6,630,243 B2 | 10/2003 | Valint et al. | |
| 6,638,563 B2 | 10/2003 | McGee et al. | |
| 6,726,322 B2 | 4/2004 | Andino et al. | |
| 6,735,328 B1 | 5/2004 | Helbing et al. | |
| 6,779,888 B2 | 8/2004 | Marmo | |
| 6,804,560 B2 | 10/2004 | Nisch et al. | |
| 6,851,805 B2 | 2/2005 | Blum et al. | |
| 6,885,818 B2 | 4/2005 | Goldstein | |
| 6,939,299 B1 | 9/2005 | Petersen et al. | |
| 6,980,842 B2 | 12/2005 | March et al. | |
| 7,018,040 B2 | 3/2006 | Blum et al. | |
| 7,131,945 B2 | 11/2006 | Fink et al. | |
| 7,169,106 B2 | 1/2007 | Fleischman et al. | |
| 7,398,119 B2 | 7/2008 | Lambert et al. | |
| 7,406,345 B2 * | 7/2008 | Muller | A61B 5/14532 600/318 |
| 7,423,801 B2 | 9/2008 | Kaufman et al. | |
| 7,429,465 B2 | 9/2008 | Muller et al. | |
| 7,441,892 B2 | 10/2008 | Hsu | |
| 7,443,016 B2 | 10/2008 | Tsai et al. | |
| 7,450,981 B2 | 11/2008 | Jeon | |
| 7,639,845 B2 | 12/2009 | Utsunomiya | |
| 7,654,671 B2 | 2/2010 | Glynn | |
| 7,699,465 B2 | 4/2010 | Dootjes et al. | |
| 7,728,949 B2 | 6/2010 | Clarke et al. | |
| 7,751,896 B2 | 7/2010 | Graf et al. | |
| 7,799,243 B2 | 9/2010 | Mather et al. | |
| 7,809,417 B2 | 10/2010 | Abreu | |
| 7,878,650 B2 | 2/2011 | Fritsch et al. | |
| 7,885,698 B2 | 2/2011 | Feldman | |
| 7,907,931 B2 | 3/2011 | Hartigan et al. | |
| 7,926,940 B2 * | 4/2011 | Blum | G02C 7/08 351/159.64 |
| 7,931,832 B2 * | 4/2011 | Pugh | B29D 11/00125 264/1.32 |
| 7,964,390 B2 | 6/2011 | Rozakis et al. | |
| 8,080,187 B2 | 12/2011 | Tepedino, Jr. et al. | |
| 8,096,654 B2 | 1/2012 | Amirparviz et al. | |
| 8,118,752 B2 | 2/2012 | Hetling et al. | |
| 8,142,016 B2 * | 3/2012 | Legerton | B29D 11/00048 264/1.32 |
| 8,224,415 B2 | 7/2012 | Budiman | |
| 8,277,713 B2 * | 10/2012 | Petisce | A61B 5/0031 204/403.05 |
| 8,348,424 B2 | 1/2013 | Pugh et al. | |
| 9,028,772 B2 * | 5/2015 | Yao | G03F 7/16 422/400 |
| 9,289,954 B2 * | 3/2016 | Linhardt | A61B 5/6821 |
| 9,307,901 B1 * | 4/2016 | Linhardt | A61B 3/101 |
| 9,320,460 B2 * | 4/2016 | Liu | A61B 5/14507 |
| 2002/0049389 A1 * | 4/2002 | Abreu | A61B 3/1241 600/558 |
| 2002/0193674 A1 | 12/2002 | Fleischman et al. | |
| 2003/0179094 A1 | 9/2003 | Abreu | |
| 2004/0027536 A1 | 2/2004 | Blum et al. | |
| 2004/0116794 A1 | 6/2004 | Fink et al. | |
| 2005/0045589 A1 | 3/2005 | Rastogi et al. | |
| 2005/0221276 A1 | 10/2005 | Rozakis et al. | |
| 2007/0016074 A1 | 1/2007 | Abreu | |
| 2007/0030443 A1 | 2/2007 | Chapoy et al. | |
| 2007/0121065 A1 | 5/2007 | Cox et al. | |
| 2007/0188710 A1 | 8/2007 | Hetling et al. | |
| 2008/0208335 A1 | 8/2008 | Blum et al. | |
| 2008/0218696 A1 | 9/2008 | Mir | |
| 2009/0033863 A1 | 2/2009 | Blum et al. | |
| 2009/0036761 A1 | 2/2009 | Abreu | |
| 2009/0057164 A1 | 3/2009 | Minick et al. | |
| 2009/0076367 A1 | 3/2009 | Sit et al. | |
| 2009/0118604 A1 | 5/2009 | Phan et al. | |
| 2009/0189830 A1 | 7/2009 | Deering et al. | |
| 2009/0196460 A1 | 8/2009 | Jakobs et al. | |
| 2010/0001926 A1 | 1/2010 | Amirparviz et al. | |
| 2010/0013114 A1 | 1/2010 | Bowers et al. | |
| 2010/0016704 A1 | 1/2010 | Naber et al. | |
| 2010/0028559 A1 | 2/2010 | Yan et al. | |
| 2010/0072643 A1 * | 3/2010 | Pugh | B29D 11/00038 264/2.7 |
| 2010/0109175 A1 | 5/2010 | Pugh et al. | |
| 2010/0110372 A1 | 5/2010 | Pugh et al. | |
| 2010/0113901 A1 | 5/2010 | Zhang et al. | |
| 2010/0133510 A1 | 6/2010 | Kim et al. | |
| 2010/0249548 A1 | 9/2010 | Muller | |
| 2011/0015512 A1 | 1/2011 | Pan et al. | |
| 2011/0028807 A1 | 2/2011 | Abreu | |

(56) References Cited

U.S. PATENT DOCUMENTS

| | | |
|---|---|---|
| 2011/0040161 A1 | 2/2011 | Abreu |
| 2011/0055317 A1 | 3/2011 | Vonog et al. |
| 2011/0063568 A1 | 3/2011 | Meng et al. |
| 2011/0084834 A1 | 4/2011 | Sabeta |
| 2011/0116035 A1 | 5/2011 | Fritsch et al. |
| 2011/0157541 A1 | 6/2011 | Peyman |
| 2011/0157544 A1 | 6/2011 | Pugh et al. |
| 2011/0184271 A1 | 7/2011 | Veciana et al. |
| 2011/0274680 A1 | 11/2011 | Mazed et al. |
| 2011/0286064 A1 | 11/2011 | Burles et al. |
| 2011/0298794 A1 | 12/2011 | Freedman |
| 2012/0026458 A1 | 2/2012 | Qiu et al. |
| 2012/0038881 A1 | 2/2012 | Amirparviz et al. |
| 2012/0041287 A1 | 2/2012 | Goodall et al. |
| 2012/0041552 A1 | 2/2012 | Chuck et al. |
| 2012/0069254 A1 | 3/2012 | Burton |
| 2012/0075168 A1 | 3/2012 | Osterhout et al. |
| 2012/0075574 A1 | 3/2012 | Pugh et al. |
| 2012/0078071 A1 | 3/2012 | Bohm et al. |
| 2012/0088258 A1 | 4/2012 | Bishop et al. |
| 2012/0092612 A1 | 4/2012 | Binder |
| 2012/0095166 A1 | 4/2012 | Ward et al. |
| 2012/0109296 A1 | 5/2012 | Fan |
| 2012/0177576 A1 | 7/2012 | Hu |
| 2012/0201755 A1 | 8/2012 | Rozakis et al. |
| 2012/0245444 A1* | 9/2012 | Otis ............... A61B 5/1486 600/345 |
| 2012/0259188 A1 | 10/2012 | Besling |
| 2013/0188125 A1 | 7/2013 | Goodenough et al. |
| 2013/0242254 A1 | 9/2013 | Tepedino et al. |
| 2014/0054805 A1* | 2/2014 | Meyers ............... B29C 39/12 264/1.31 |
| 2014/0200424 A1* | 7/2014 | Etzkorn ........... A61B 5/14532 600/345 |
| 2016/0066825 A1* | 3/2016 | Barrows ............ A61B 5/1477 600/345 |

FOREIGN PATENT DOCUMENTS

| | | |
|---|---|---|
| EP | 1061874 | 12/2000 |
| EP | 1818008 | 8/2007 |
| EP | 1947501 | 7/2008 |
| EP | 1617757 | 8/2009 |
| EP | 2457122 | 5/2012 |
| WO | 95/04609 | 2/1995 |
| WO | 01/16641 | 3/2001 |
| WO | 01/34312 | 5/2001 |
| WO | 03/065876 | 8/2003 |
| WO | 2004/060431 | 7/2004 |
| WO | 2004/064629 | 8/2004 |
| WO | WO 2004/064629 * | 8/2004 |
| WO | WO2004064629 * | 8/2004 |
| WO | 2006/015315 | 2/2006 |
| WO | 2009/094643 | 7/2009 |
| WO | 2010/105728 | 9/2010 |
| WO | 2010/133317 | 11/2010 |
| WO | 2011/011344 | 1/2011 |
| WO | 2011/034592 | 3/2011 |
| WO | 2011/035228 | 3/2011 |
| WO | 2011/035262 | 3/2011 |
| WO | 2011/083105 | 7/2011 |
| WO | 2011/163080 | 12/2011 |
| WO | 2012/035429 | 3/2012 |
| WO | 2012/037455 | 3/2012 |
| WO | 2012/051167 | 4/2012 |
| WO | 2012/051223 | 4/2012 |
| WO | 2012052765 | 4/2012 |

OTHER PUBLICATIONS

Brahim, et al., "Polypyrrole-hydrogel composites for the construction of clinically important biosensors," 2002, Biosensors & Bioelectronics, pp. 53-59, vol. 17.

Chen, et al., "Microfabricated Implantable Parylene-Based Wireless Passive Intraocular Pressure Sensors," Journal of Microelectromechanical Systems, Dec. 2008, pp. 1342-1351, vol. 17, No. 6.

Chu, et al., "Soft Contact-lens Sensor for Monitoring Tear Sugar as Novel Wearable Device of Body Sensor Network," http://www.ksi edu/seke/dms11/DMS/2_Kohji_Mitsubayashi.pdf, Last accessed Jul. 27, 2012, 4 pages.

"Contact Lenses: Look Into My Eyes," The Economist, Jun. 2, 2011, http://www.economist.com/node/18750624/print, Last accessed Mar. 13, 2012, 8 pages.

Haders, "New Controlled Release Technologies Broaden Opportunities for Ophthalmic Therapies," Drug Delivery Technology, Jul./Aug. 2009, pp. 48-53, vol. 8, No. 7.

Holloway, "Microsoft developing electronic contact lens to monitor blood sugar," Gizmag, Jan. 5, 2012, http://www.gizmag.com/microsoft-electronic-diabetic-contact-lens/20987/, Last accessed Mar. 13, 2012. 5 pages.

Huang, et al., "Wrinkling of Ultrathin Polymer Films," Mater. Res. Soc. Symp. Proc., 2006, 6 pages, vol. 924, Materials Research Society.

Hurst, "How contact lenses could help save your life," Mail Online, Apr. 19, 2010, http://www.dailymail.co.uk/health/article-1267345/How-contact-lenses-help-save-life.html, Last accessed Jul. 27, 2012.

Liao, et al., "A 3-μW CMOS Glucose Sensor for Wireless Contact-Lens Tear Glucose Monitoring ," IEEE Journal of Solid-State Circuits, Jan. 2012, pp. 335-344, vol. 47, No. 1.

Liao, et al., "A 3-μW Wirelessly Powered CMOS Glucose Sensor for an Active Contact Lens," 2011 IEEE International Solid-State Circuits Conference, Session 2, Feb. 21, 2011, 3 pages.

Lingley, et al., "A Single-Pixel Wireless Contact Lens Display," Journal of Micromechanics and Microengineering, 2011, pp. 1-8.

Lingley, et al., "Multipurpose integrated active contact lenses," SPIE, 2009, 2 pages.

Liu, et al., "Miniature Amperometric Self-Powered Continuous Glucose Sensor with Linear Response," Analytical Chemistry, 2012, 7 pages.

Loncar, et al., "Design and Fabrication of Silicon Photonic Crystal Optical Waveguides," Journal of Lightwave Technology, Oct. 2000, pp. 1402-1411, vol. 18, No. 10.

Murdan, "Electro-responsive drug delivery from hydrogels," Journal of Controlled Release, 2003, pp. 1-17, vol. 92.

Pandey, et al., "A Fully Integrated RF-Powered Contact Lens With a Single Element Display," IEEE Transactions on Biomedical Circuits and Systems, Dec. 2010, pp. 454-461, vol. 4, No. 6.

Parviz, Babak A., "Augmented Reality in a Contact Lens," IEEE Spectrum, Sep. 2009, http://spectrum.ieee.org/biomedical/bionics/augmented-reality-in-a-contact-lens/0, Last accessed Mar. 14, 2012, 6 pages.

Selner, et al., "Novel Contact Lens Electrode Array for Multi-electrode Electroretinography (meERG)," IEEE, 2011, 2 pages.

Singh , et al., "Novel Approaches in Formulation and Drug Delivery using Contact Lenses," Journal of Basic and Clinical Pharmacy, May 2011, pp. 87-101, vol. 2, Issue 2.

Thomas, et al., "Functional Contact Lenses for Remote Health Monitoring in Developing Countries," IEEE Global Humanitarian Technology Conference, 2011, pp. 212-217, IEEE Computer Society.

Tweedie, et al., "Contact creep compliance of viscoelastic materials via nanoindentation," J. Mater. Res., Jun. 2006, pp. 1576-1589, vol. 21, No. 2, Materials Research Society.

Wall, K., "Active contact lens that lets you see like the Terminator patented," Feb. 10, 2012, http://vvww.patexia.com/feed/active-contact-lens-that-lets-you-see-like-the-terminator-patented-2407, Last accessed Mar. 28, 2012, 5 pages.

Zarbin, et al., "Nanotechnology in ophthalmology," Can J Ophthalmol, 2010, pp. 457-476, vol. 45, No. 5.

Badugu et al., "A Glucose Sensing Contact Lens: A Non-Invasive Technique for Continuous Physiological Glucose Monitoring," Journal of Fluorescence, Sep. 2003, pp. 371-374, vol. 13, No. 5.

(56) References Cited

OTHER PUBLICATIONS

Carlson et al., "A 20 mV Input Boost Converter With Efficient Digital Control for Thermoelectric Energy Harvesting," IEEE Journal of Solid-State Circuits, Apr. 2010, pp. 741-750, vol. 45, No. 4.
Chu et al., "Biomedical soft contact-lens sensor for in situ ocular biomonitoring of tear contents," Biomed Microdevices, 2011, pp. 603-611, vol. 13.
Chu et al., "Soft contact lens biosensor for in situ monitoring of tear glucose as non-invasive blood sugar assessment," Talanta, 2011, pp. 960-965, vol. 83.
Ho et al., "Contact Lens With Integrated Inorganic Semiconductor Devices," MEMS 2008. IEEE 21st International Conference on. IEEE, 2008., pp. 403-406.
Lähdesmäki et al., "Possibilities for Continuous Glucose Monitoring by a Functional Contact Lens," IEEE Instrumentation & Measurement Magazine, Jun. 2010, pp. 14-17.
Lingley et al., "A contact lens with integrated micro solar cells," Microsyst Technol, 2012, pp. 453-458, vol. 18.
Parviz, Babak A., "For Your Eyes Only," IEEE Spectrum, Sep. 2009, pp. 36-41.
Saeedi, E. et al., "Self-assembled crystalline semiconductor optoelectronics on glass and plastic," J. Micromech. Microeng., 2008, pp. 1-7, vol. 18.
Saeedi et al., "Self-Assembled Inorganic Micro-Display on Plastic," Micro Electro Mechanical Systems, 2007. MEMS. IEEE 20th International Conference on. IEEE, 2007., pp. 755-758.
Sensimed Triggerfish, Sensimed Brochure, 2010, 10 pages.
Shih, Yi-Chun et al., "An Inductorless DC-DC Converter for Energy Harvesting With a 1.2-μW Bandgap-Referenced Output Controller," IEEE Transactions on Circuits and Systems-II: Express Briefs, Dec. 2011, pp. 832-836, vol. 58, No. 12.
Shum et al., "Functional modular contact lens," Proc. of SPIE, 2009, pp. 73970K-1 to 73970K-8, vol. 7397.
Stauth et al., "Self-assembled single-crystal silicon circuits on plastic," PNAS, Sep. 19, 2006, pp. 13922-13927, vol. 103, No. 38.
Yao, H. et al., "A contact lens with integrated telecommunication circuit and sensors for wireless and continuous tear glucose monitoring," J. Micromech. Microeng., 2012, pp. 1-10, vol. 22.
Yao, H. et al., "A Dual Microscal Glucose Sensor on a Contact Lens, Tested in Conditions Mimicking the Eye," Micro Electro Mechanical Systems (MEMS), 2011 IEEE 24th International Conference on. IEEE, 2011, pp. 25-28.
Yao et al., "A contact lens with embedded sensor for monitoring tear glucose level," Biosensors and Bioelectronics, 2011, pp. 3290-3296, vol. 26.
Yao, H. et al., "A Soft Hydrogel Contact Lens with an Encapsulated Sensor for Tear Glucose Monitoring," Micro Electro Mechanical Systems (MEMS), 2012 IEEE 25th International Conference on. IEEE, 2012, pp. 769-772.
Yeager et al., "A 9 μA, Addressable Gent Sensor Tag for Biosignal Acquistion," IEEE Journal of Solid-State Circuits, Oct. 2010, pp. 2198-2209, vol. 45, No. 10.
Zhang et al., "Design for Ultra-Low Power Biopotential Amplifiers for Biosignal Acquistion Applications," IEEE Transactions on Biomedical Circuits and Systems, 2012, pp. 344-355, vol. 6, No. 4.

* cited by examiner

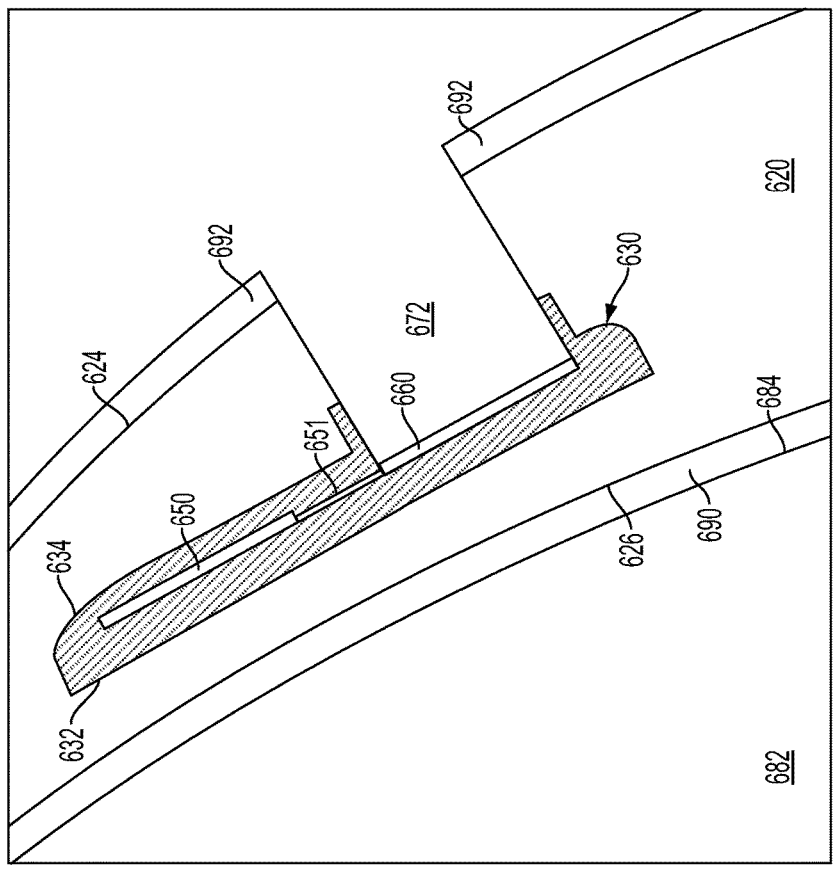
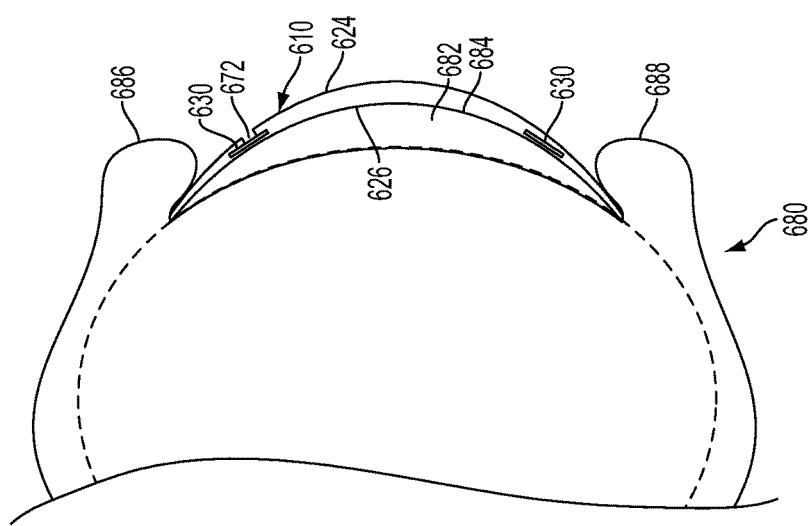
FIG. 6d
FIG. 6c

METHODS FOR MOLD RELEASE OF BODY-MOUNTABLE DEVICES INCLUDING MICROELECTRONICS

BACKGROUND

Unless otherwise indicated herein, the materials described in this section are not prior art to the claims in this application and are not admitted to be prior art by inclusion in this section.

A body-mountable device may be configured to monitor health-related information based on at least one analyte detected in a fluid of a user wearing the body-mountable device. For example, the body-mountable device may comprise an eye-mountable device that may be in the form of a contact lens that includes a sensor configured to detect at least one analyte (e.g., glucose) in a tear film of a user wearing the eye-mountable device. The body-mountable device may also be configured to monitor various other types of health-related information.

Molding is often used in contact lens manufacturing. In many commercial contact lens manufacturing processes, a pre-polymer (e.g., poly(hydroxyethyl methacrylate; 'HEMA') is introduced between two curved molds, cured and released from the mold for further manipulations (e.g., mechanical polishing or sterilizing). Release is typically achieved by mechanical rupture of the mold or other processes. If the contact lens has embedded circuitry or other mechanically-sensitive components embedded therein (e.g., a sensor), such release processes can damage the embedded components.

SUMMARY

In one aspect, the present disclosure provides a method for fabricating a body-mountable device. The method involves: forming a first polymer layer between a first mold surface and second mold surface, wherein the first mold surface has a first surface layer, the second mold surface has a second surface layer, and at least one of the first or second surface layers facilitates release of the first polymer layer from at least one of the first or second mold surfaces, and wherein the first polymer layer defines a first side of the body-mountable device; positioning a structure on the first polymer layer, wherein the structure comprises at least one sensor configured to detect an analyte; and forming a second polymer layer between the first polymer layer and a third mold surface, such that the structure is at least partially enclosed by the first polymer layer and the second polymer layer, wherein the third mold surface has a third surface layer that facilitates release of the second polymer layer from the third mold surface, and wherein the second polymer layer defines a second side of the body-mountable device.

In another aspect, the invention provides a device for fabricating a body-mountable device having a first polymer layer defining a first side of the body-mountable device, a second polymer layer defining a second side of the body-mountable device, and a structure comprising a sensor between the first and second polymer layers. The device includes: a first mold surface, wherein the first mold surface includes a first surface layer configured to facilitate release of the first polymer layer from the first mold surface; and a second mold surface, wherein the second mold surface includes a second surface layer configured to facilitate release of the second polymer layer from the second mold surface.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 6c is a side cross-section view of the eye-mountable device of FIGS. 6a and 6b while mounted to a corneal surface of an eye, according to an example embodiment.

FIG. 6d is a side cross-section view showing the tear film layers surrounding the surfaces of the eye-mountable device mounted as shown in FIG. 6c, according to an example embodiment.

DETAILED DESCRIPTION

Figure 1:
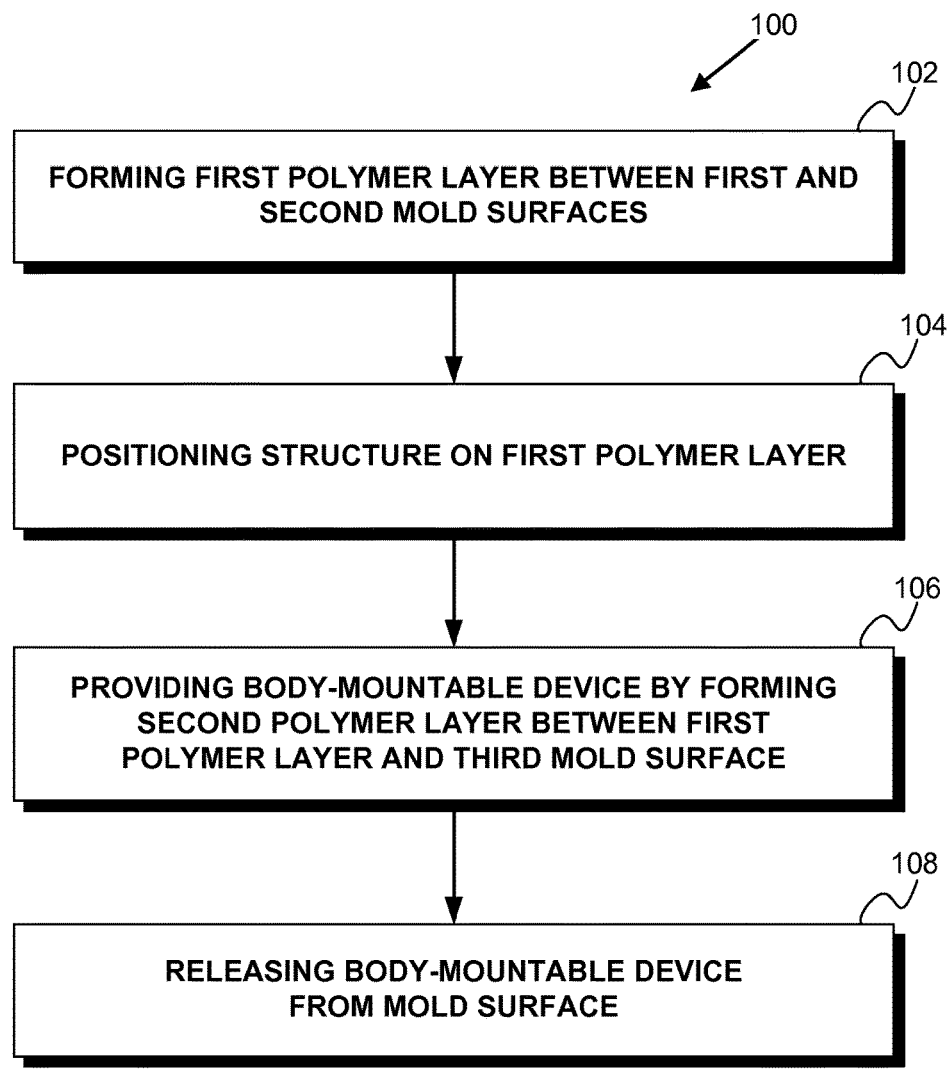
FIG. 1 is a flow chart illustrating a method according to an example embodiment.

The following detailed description describes various features and functions of the disclosed methods, apparatus, and systems with reference to the accompanying figures. In the figures, similar symbols typically identify similar components, unless context dictates otherwise. The illustrative method, apparatus, and system embodiments described herein are not meant to be limiting. It will be readily understood that certain aspects of the disclosed methods, apparatus, and systems can be arranged and combined in a wide variety of different configurations, all of which are contemplated herein.

I. DEFINITIONS

The term "alkyl" as used herein, means a straight or branched chain hydrocarbon containing from 1 to 12 carbon atoms, unless otherwise specified. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, and n-decyl.

The term "alkenyl" as used herein, means a straight or branched chain hydrocarbon containing from 2 to 12 carbons, unless otherwise specified, and containing at least one carbon-carbon double bond. Representative examples of alkenyl include, but are not limited to, ethenyl, 2-propenyl, 2-methyl-2-propenyl, 3-butenyl, 4-pentenyl, 5-hexenyl, 2-heptenyl, 2-methyl-1-heptenyl, 3-decenyl, and 3,7-dimethylocta-2,6-dienyl.

The term "alkoxy" as used herein, means an alkyl group, as defined herein, appended to the parent molecular moiety through an oxygen atom. Representative examples of alkoxy include, but are not limited to, methoxy, ethoxy, propoxy, 2-propoxy, butoxy, tert-butoxy, pentyloxy, and hexyloxy.

The term "halogen" as used herein, means —Cl, —Br, —I or —F.

The term "haloalkyl" as used herein, means at least one halogen, as defined herein, appended to the parent molecular moiety through an alkyl group, as defined herein. Representative examples of haloalkyl include, but are not limited to, chloromethyl, 2-fluoroethyl, trifluoromethyl, pentafluoroethyl, and 2-chloro-3-fluoropentyl.

The term "haloalkoxyl" as used herein, means at least one halogen, as defined herein, appended to the parent molecular moiety through an alkoxy group, as defined herein. Representative examples of haloalkoxyl include, but are not limited to, chloromethoxy, 2-fluoroethoxy, trifluoromethoxy, pentafluoroethoxy, and 2-chloro-3-fluoropentoxy.

The term "cycloalkyl" as used herein, means a monocyclic or a bicyclic cycloalkyl ring system. Monocyclic ring systems are cyclic hydrocarbon groups containing from 3 to 8 carbon atoms, where such groups can be saturated or unsaturated, but not aromatic. In certain embodiments, cycloalkyl groups are fully saturated. Examples of monocyclic cycloalkyls include cyclopropyl, cyclobutyl, cyclopentyl, cyclopentenyl, cyclohexyl, cyclohexenyl, cycloheptyl, and cyclooctyl. Bicyclic cycloalkyl ring systems are bridged monocyclic rings or fused bicyclic rings. Bridged monocyclic rings contain a monocyclic cycloalkyl ring where two non-adjacent carbon atoms of the monocyclic ring are linked by an alkylene bridge of between one and three additional carbon atoms (i.e., a bridging group of the form —$(CH_2)_w$—, where w is 1, 2, or 3). Representative examples of bicyclic ring systems include, but are not limited to, bicyclo[3.1.1]heptane, bicyclo[2.2.1]heptane, bicyclo[2.2.2]octane, bicyclo[3.2.2]nonane, bicyclo[3.3.1]nonane, and bicyclo[4.2.1]nonane. Fused bicyclic cycloalkyl ring systems contain a monocyclic cycloalkyl ring fused to either a phenyl, a monocyclic cycloalkyl, a monocyclic cycloalkenyl, a monocyclic heterocyclyl, or a monocyclic heteroaryl. The bridged or fused bicyclic cycloalkyl is attached to the parent molecular moiety through any carbon atom contained within the monocyclic cycloalkyl ring.

The term "halophenyl" as used herein, means at least one halogen, as defined herein, appended to the parent molecular moiety through phenylene group. Representative examples of halophenyl include, but are not limited to, chlorophenyl, 4-fluorophenyl, 2,4-dichlorophenyl, 2,4,6-trifluorophenyl, and perfluorophenyl.

The term "leaving group" as used herein, means a chemical entity that is capable of being displaced from a silicon atom by a nucleophile, as familiar to those skilled in the art. For example, see March, J., *Advanced Organic Chemistry*, 4th Ed. (1992), at pages 642-644, which are hereby incorporated by reference in their entirety. Representative examples of leaving groups include, but are not limited to, trimethylammonium, trimethylstannyl, trimethylsilyl, chloro, bromo, iodo, $C_1$-$C_{10}$alkylsulfonate, $C_1$-$C_{10}$haloalkylsulfonate, or phenylsulfonate, wherein the phenyl is optionally substituted with 1, 2, or 3 groups which are each independently halogen or $C_1$-$C_4$ alkyl (e.g., besylate, tosylate, mesylate ($CH_3S(O)_2O^-$), triflate ($CF_3S(O)_2O^-$), nonaflate ($CF_3CF_2CF_2CF_2S(O)_2O^-$), 2,4,6-trimethylbenzenesulfonate, or 2,4,6-triisopropylbenzenesulfonate).

II. INTRODUCTION

A body-mountable device may be configured to monitor health-related information based on at least one analyte detected in a fluid of a user wearing the body-mountable device. Such a body-mountable device may include a structure located between a first polymer layer and second polymer layer. Further, the structure may include one or more components, such as a sensor that is configured to detect the at least one analyte.

Such a body-mountable device may be formed (e.g., fabricated) by curing a pre-polymer material in a mold. Fabrication may be a multi-step process, involving formation of a first polymer layer, positioning the structure on the first polymer layer, formation of a second polymer layer, and release of the device from the mold.

Beneficially, embodiments described herein may help to improve the release of the device from the mold. For instance, the mold surface, in accordance with an example embodiment, may have properties that facilitate release of the device from the mold surface without damage to the polymer or structure. The mold properties may be inherent to the surface of the mold itself (i.e., integrated into the composition of the mold), or added as a material layer on the mold surface. In either arrangement, the mold includes a surface layer that facilitates release of the device from the mold without damage to the device.

As used throughout this disclosure, the anterior side of the body-mountable device refers to an outward-facing side of the body-mountable device, whereas the posterior side of the body-mountable device refers to an inward-facing side of the body-mountable device. In particular, when the body-mountable device comprises an eye-mountable device and the eye-mountable device is mounted on an eye of the user, the anterior side corresponds to a side of the eye-mountable device that is facing outward and thus not touching the eye of the user. Further, when the eye-mountable device is mounted on an eye of the user, the posterior side corresponds to a side of the eye-mountable device that is facing inward and thus touching the eye of the user.

III. EXAMPLE METHODS

Example methods for using a fabrication device to form a body-mountable device are disclosed. FIG. 1 is a flow chart illustrating a method 100 according to an example embodiment. More specifically, as shown by block 102, the method 100 may involve forming a first polymer layer between a first mold surface and a second mold surface. Further, as shown by block 104, the method 100 may involve positioning a structure on the first polymer layer. Further still, as shown by block 106, the method 100 may involve forming a second polymer layer between a third mold surface the first polymer layer, such that the structure is at least partially enclosed by the first polymer layer and the second polymer layer. In this example, at least one of the first mold surfaces, second mold surface or third mold surface facilitates release of the device from the mold surface (block 108), and the first polymer layer defines a first side of the body-mountable device and the second polymer layer defines a second side of the body-mountable device opposite the first side.

Figure 2:
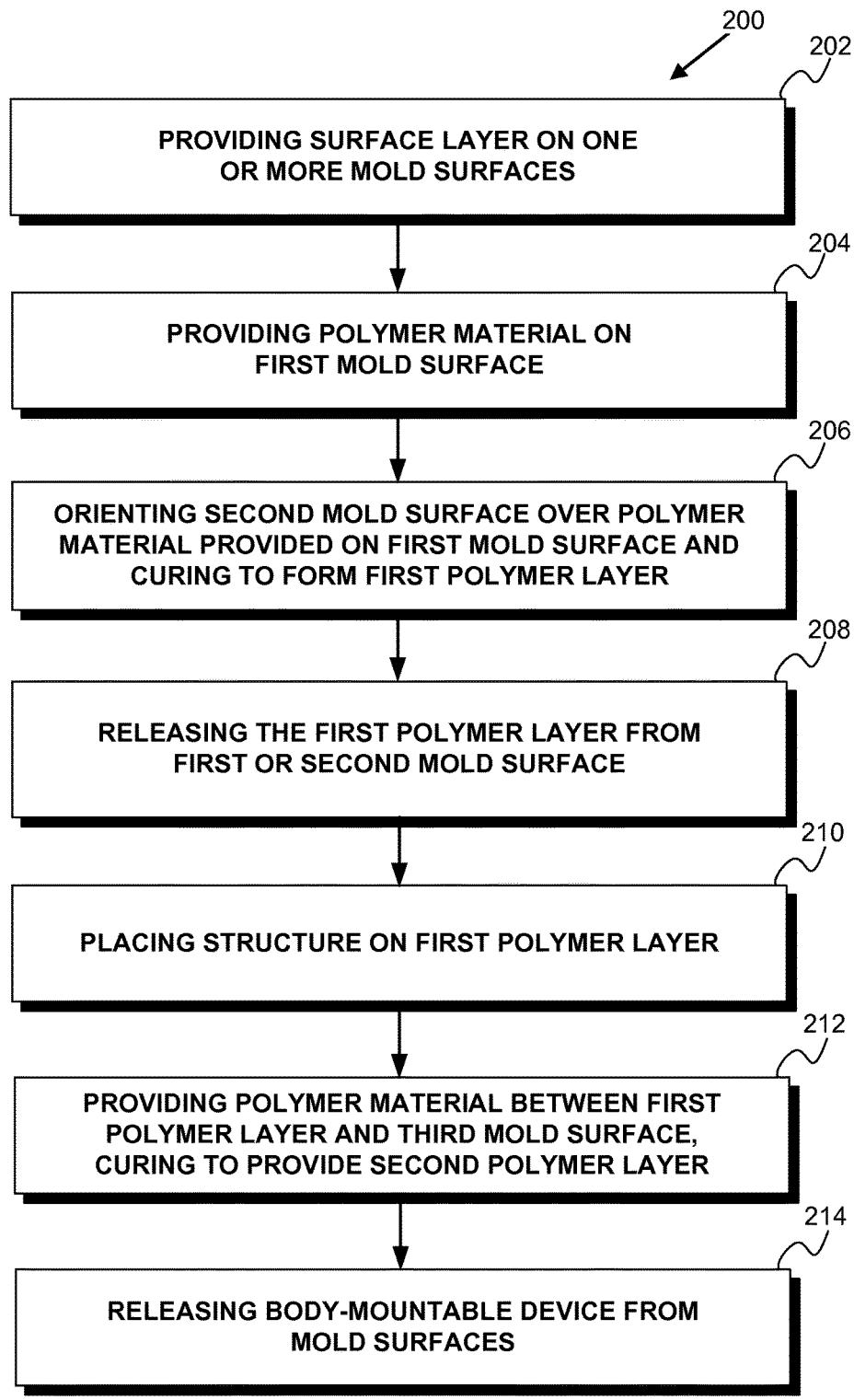
FIG. 2 is a flow chart illustrating another method according to an example embodiment.

In addition, FIG. 2 is a flow chart illustrating another method 200 according to an example embodiment. More specifically, as shown by block 202, the method 200 may involve providing a surface layer on the surface of at least one of the first, second or third mold surfaces. The method further involves providing polymer material on the first mold surface, as shown by block 204, orienting the second mold surface over the polymer material on the first mold surface, and forming a first polymer layer by curing the polymer material (block 206). Further, as shown by block 208, the method 200 may involve releasing the first polymer layer from the first or second mold surface, wherein the first polymer layer retains contact with the first or second mold surface. The method may further involve the placement of a structure on the first polymer layer, as shown in block 210. Further, the method may involve providing a polymer material between the first polymer layer and a third mold surface, and curing the polymer material to provide a second polymer layer (block 212). Further, as shown by block 214, the method may involve release from the mold surfaces to provide a body-mountable device.

For purposes of illustration, the method 100 and the method 200 are described below as being carried out by a fabrication device that utilizes various methods and/or processes for fabricating body-mountable devices. It should be understood, however, that the method 100 and/or the method 200 may be carried out by a fabrication device that utilizes other methods and/or processes for fabricating body-mountable devices.

Moreover, for purposes of illustration, the method 100 and the method 200 are described below in a scenario where a body-mountable device comprises an eye-mountable device. It should be understood, however, that the method 100 and/or the method 200 may involve scenarios where the body-mountable device comprises other mountable devices that are mounted on or in other portions of the human body. For example, the body-mountable device may comprise a tooth-mountable device and/or a skin-mountable device.

Method 100 and method 200 will now be described in greater detail below with reference to FIGS. 3a-3g. It is noted that relative dimensions in FIGS. 3a-3g are not necessarily to scale, but have been rendered for purposes of explanation only in describing the method 100 and the method 200.

A. Forming a Surface Layer

Figure 3A:
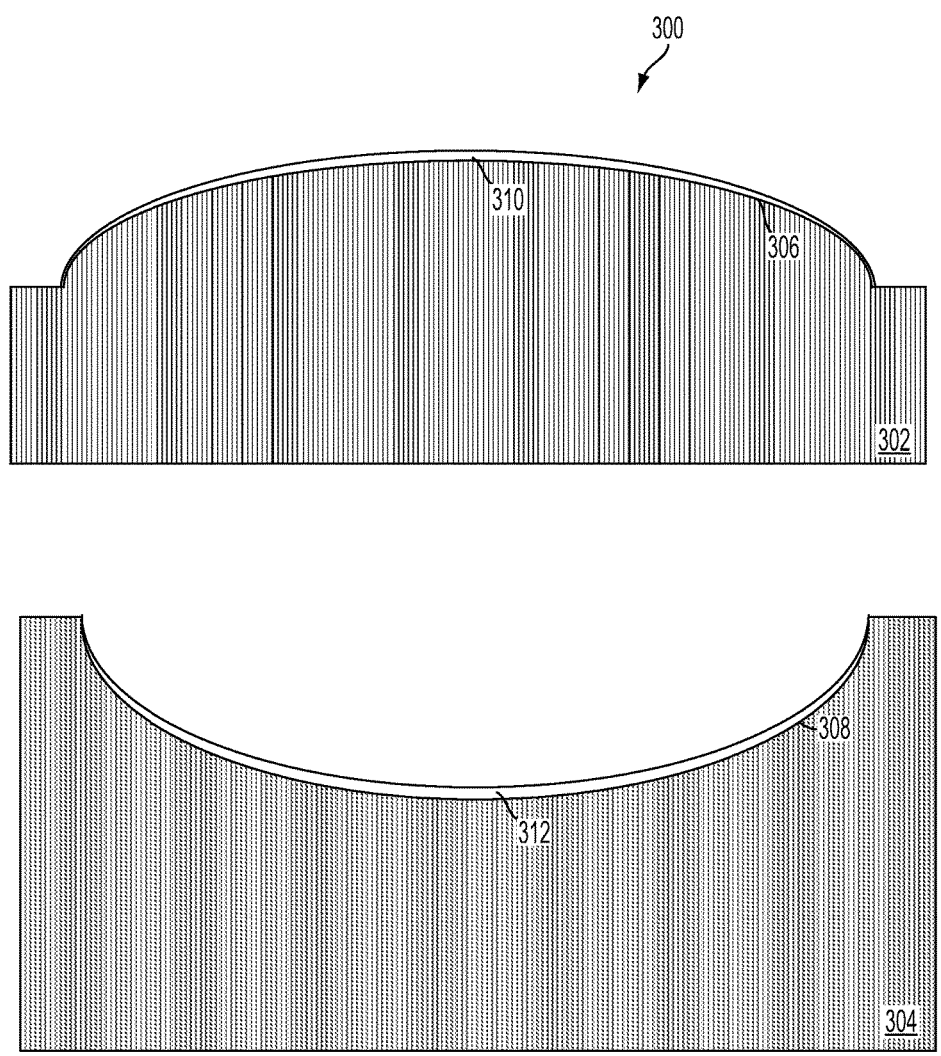
FIG. 3a is an illustration of mold pieces having a surface layer, according to an example embodiment.

As mentioned above, at block 202, the fabrication device may be used to form a first polymer layer. The fabrication device may include molding pieces, such as molding pieces that are suitable for cast molding. FIG. 3a illustrates a fabrication device 300 that includes molding pieces that may be used to form the first polymer layer. In particular, FIG. 3a illustrates the fabrication device 300 including a first molding piece 302 and a second molding piece 304.

Prior to formation of the first polymer layer, a surface layer may be provided on one or more mold surfaces. In some embodiments, a first surface layer 310 is provided on a first mold surface 306 of the first molding piece 302. In some embodiments, a second surface layer 312 is provided on a second mold surface 308 of the second molding piece 304. In other embodiments, both the first molding piece 302 and the second molding piece 304 are provided with surface layers, i.e., with first surface layer 310 on first mold surface 306 and second surface layer 312 on second mold surface 308. The first surface layer 310 and the second surface layer 312 may facilitate release of the first polymer layer from the first mold surface 306 and second mold surface 308, respectively.

Depending on the composition of the surface layer, as well as the composition of the molding piece, the surface layer may be provided through a number of different methods. The surface layer may be deposited on the mold surface in a substantially uniform thickness, so as to not substantially alter the curvature and/or dimensions of the molding piece. In some embodiments, the surface layer is between about 1 Å and about 100 μm in thickness.

In some embodiments, the surface layer may include a silane. Depending on the chemical structure of the silane and the composition of the mold surface, the adhesion of the silane to the mold surface may be chemical (e.g., covalent bonds), mechanical, or dispersive (e.g., van der Waals forces).

In embodiments where the silane is covalently bound to the mold surface, the silane surface layer may have the structure of formula I:

(I)

wherein

A is an atom on the mold surface; and $R^1$, $R^2$ and $R^3$ are each hydrogen, halogen, alkyl, alkenyl, alkoxy, haloalkyl, haloalkoxy, cycloalkyl, phenyl, halophenyl or -A.

In some embodiments, the silane is a structure of formula (I), wherein:

(a) at least one of $R^1$, $R^2$ and $R^3$ is hydrogen;
(b) at least one of $R^1$, $R^2$ and $R^3$ is halogen;
(c) at least one of $R^1$, $R^2$ and $R^3$ is alkyl;
(d) at least one of $R^1$, $R^2$ and $R^3$ is alkenyl;
(e) at least one of $R^1$, $R^2$ and $R^3$ is alkoxy;
(f) at least one of $R^1$, $R^2$ and $R^3$ is haloalkyl;
(g) at least one of $R^1$, $R^2$ and $R^3$ is haloalkoxy;
(h) at least one of $R^1$, $R^2$ and $R^3$ is cycloalkyl;
(i) at least one of $R^1$, $R^2$ and $R^3$ is phenyl;
(j) at least one of $R^1$, $R^2$ and $R^3$ is halophenyl
(k) at least two of $R^1$, $R^2$ and $R^3$ are hydrogen;
(l) at least two of $R^1$, $R^2$ and $R^3$ are halogen;
(m) at least two of $R^1$, $R^2$ and $R^3$ are alkyl;
(n) at least two of $R^1$, $R^2$ and $R^3$ are alkenyl;
(o) at least two of $R^1$, $R^2$ and $R^3$ are alkoxy;
(p) at least two of $R^1$, $R^2$ and $R^3$ are haloalkyl;
(q) at least two of $R^1$, $R^2$ and $R^3$ are haloalkoxy;
(r) at least two of $R^1$, $R^2$ and $R^3$ are cycloalkyl;
(s) at least two of $R^1$, $R^2$ and $R^3$ are phenyl;
(t) at least two of $R^1$, $R^2$ and $R^3$ are halo phenyl;
(u) $R^1$, $R^2$ and $R^3$ are hydrogen;
(v) $R^1$, $R^2$ and $R^3$ are halogen;
(w) $R^1$, $R^2$ and $R^3$ are alkyl;
(x) $R^1$, $R^2$ and $R^3$ are alkenyl;
(y) $R^1$, $R^2$ and $R^3$ are alkoxy;
(z) $R^1$, $R^2$ and $R^3$ are haloalkyl;
(aa) $R^1$, $R^2$ and $R^3$ are haloalkoxy;
(bb) $R^1$, $R^2$ and $R^3$ are cycloalkyl;

(cc) $R^1$, $R^2$ and $R^3$ are phenyl;
(dd) $R^1$, $R^2$ and $R^3$ are halophenyl;
(ee) at least one of $R^1$, $R^2$ and $R^3$ is -A;
(ff) at least two of $R^1$, $R^2$ and $R^3$ are -A;
(gg) A is —O—;
(hh) A is —N(H)—;
(ii) A is —S—.

In embodiments where the silane is bound to the mold surface by means other than a covalent bond, the silane surface layer may include silane compounds of formula II:

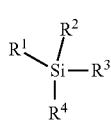

(II)

wherein
$R^1$, $R^2$, $R^3$ and $R^4$ are each hydrogen, halogen, alkyl, alkenyl, alkoxy, haloalkyl, haloalkoxy, cycloalkyl, phenyl, halophenyl, —N(H)SiMe$_3$ or —SiR$^1$R$^2$R$^3$.

For example, when $R^4$ is —SiR$^1$R$^2$R$^3$ and $R^1$, $R^2$ and $R^3$ are all hydrogen, the silane surface layer may be disilane. In an example embodiment where $R^4$ and $R^3$ are —SiR$^1$R$^2$R$^3$ and $R^1$ and $R^2$ are all hydrogen, the silane surface layer may be polysilane. In some embodiments of formula (II), $R^1$, $R^2$ and $R^3$ are as described in embodiments (a)-(dd).

In some embodiments, the silane may be a halogenated silane, such as a fluorosilane, chlorosilane, bromosilane, iodosilane, perfluorosilane, perchlorosilane, trifluorosialne, trichlorosilane or any combination thereof. In some embodiments, the silane may be perfluorodecyltrichlorosilane (FDTS), undecenyltrichlorosilane (UTS), vinyltrichlorosilane (VTS), decyltrichlorosilane (DTS), heptadecafluorodecyltrichlorosilane, octadecyltrichlorosilane (OTS), dimethyldichlorosilane (DDMS), dodecenyltrichlorosilane (DOTS), fluorotetrahydrooctyldimethylchlorosilane (FOTS), perfluorooctyldimethylchlorosilane, aminopropylmethoxysilane (APTMS), 3-(2-aminoethyl)-aminopropyltrimethoxysilane, fluoropropylmethyldichlorosilane or perfluorodecyldimethyl-chlorosilane. In other embodiments, the silane may be a perfluoroalkyltrichlorosilane (such as (tridecafluoro-1,1,2,2-tetrahydrooctyl)trichlorosilane), a hexamethyldisilazane (such as (bis(trimethylsilyl)amine), or an alkoxysilane (such as trimethoxysilane, triethoxysilane (TES), phenyltrimethoxysilane or vinyltriethoxysilane).

The silane may be deposited by a number of ways currently known in the art, which include, for example, subjecting the mold surface to a gas or liquid phase silane to form a chemically or covalently bonded monolayer of silane compounds on the mold surface. In some examples, the silane surface layer may be deposited using a molecular vapor deposition process (MVD). Other examples include dip-coating or spray-coating a solution of silane, followed by thermal curing and washing steps.

In some embodiments where the silane is covalently bound to the mold surface, the silane used to form the silane surface layer may be a compound of the formula (III):

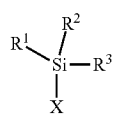

(III)

wherein
$R^1$, $R^2$ and $R^3$ are as described herein for formula (I); and
X is a leaving group.

In some examples the leaving group attached to silicon may be a halogen, ether, ester, amine hydroxyl or other functional group optionally substituted with an electron withdrawing group (e.g., trifluoromethanesulfonate (—OS(O)$_2$CF$_3$) or methanesulfonate (—OS(O)$_2$CH$_3$).

In other embodiments, at least one of $R^1$, $R^2$ and $R^3$ may be a halogen group. Halogens can be leaving groups, and may be displaced during formation of the surface layer. The resulting silane surface layer may include a silane that has more than one covalent bonds to an atom on the mold surface. In some examples, the silane may have one bond to an atom on the mold surface. In other examples, the silane may have bonds to two atoms on the mold surface. In some embodiments, the silane may have bonds to three atoms on the mold surface.

In some embodiments, the deposition of the silane on an metal oxide layer may involve the chemical reaction of the silicon atom with hydroxyl (—OH) groups of the metal oxide surface layer to form a covalent bond by displacement of the leaving group and/or $R^1$, $R^2$ and $R^3$ groups that may be suitable leaving groups.

In embodiments where the silane is bound to the mold surface by means other than a covalent bond, the silane used to form the silane surface layer may be a compound of formula (II) as described herein.

In some embodiments, the molding piece may include a metal (e.g., aluminum or an aluminum alloy). In such embodiments, an oxide layer may be formed on the mold surface before the silane surface layer is formed. The oxide layer may be formed using any method known in the art, such as a chemical vapor deposition (CVD) process, plasma-enhanced chemical vapor deposition (PE-CVD) process, etc. In some embodiments the thin film may be a native oxide layer. The oxide layer may have a thickness of between about 1 nm and about 100 nm.

In other embodiments, the molding piece may include a polymer (e.g., polycarbonate, nylon polysulfone, polymethyl methacrylate, polyethylene terephthalate, polycarbonate, polystyrene, polybutadiene, or polyethylene). In such embodiments, the polymeric mold surface may be chemically activated before the silane surface layer is formed. Activation may be accomplished using any method known in the art, such as deprotonation, oxidation, amination, carboxylation and deprotection of protecting groups. In some embodiments, the polymer mold surface includes functional groups capable of covalent bond formation with a silane, such as hydroxyl, amine or sulfur groups.

The silane surface layer may have a thickness between 1 Å and 100 μm. In some embodiments, the thickness is between about 1 Å and about 80 nm, about 1 Å and about 50 nm, about 1 Å and about 40 nm, about 1 Å and about 10 nm, about 100 Å and about 10 nm, about 100 Å and about 1 nm, about 1 nm and about 10 nm, or about 1 nm and about 40 nm.

The critical surface tension of the silane surface layer may influence the release of the first polymer layer, partially fabricated device or fabricated device from the mold surfaces. The surface of molding pieces that include materials such as aluminum or polycarbonate have high critical surface tension, or wettability. A high wettability may result in strong adhesive forces between the mold surface and a polymer layer in contact with the mold surface, which may not provide efficient release of the polymer layer from the mold surface. When a silane is provided on the mold surface, the resulting silane surface layer may have a lower critical surface tension than the mold surface. The silane surface layer may therefore have a lower wettability, and provide efficient release of the polymer layer from the mold surface. For example, the critical surface tension of aluminum and polycarbonate are 45 mJ/m$^2$ and 44 mJ/m$^2$, respectively. The surface tension of heptadecafluorodecyltrichlorosilane is 12 mJ/m$^2$.

In some embodiments, the silane surface layer has a critical surface tension equal to or less than about 40 mJ/m$^2$. In other embodiments, the critical surface tension may be between about 10 mJ/m$^2$ and about 30 mJ/m$^2$, between about 10 mJ/m$^2$ and about 20 mJ/m$^2$, between about 20 mJ/m$^2$ and about 30 mJ/m$^2$ or between about 30 mJ/m$^2$ and about 40 mJ/m$^2$.

In some embodiments, the surface layer may include one or more water-soluble polymers. Suitable water-soluble polymers may include polymers having monomeric units with at least one hydrophilic functional group. Possible hydrophilic functional groups include, but are not limited to, hydroxy, carboxylic acid, carboxylic salt, amine, amide and alkylene oxide functionalities. In some examples, the water-soluble polymer may include a polysaccharide, poly(acrylic acid) (PAA), dextran, poly(methacrylic acid), poly(acrylamide), poly(ethylene imine), poly(vinyl alcohol), poly(ethylene oxide), poly(ethylene oxide), chitosan, sucrose, or a copolymer thereof. In some embodiments, the water-soluble polymer comprises monosaccharide units, a disaccharide, polysaccharide, or combination thereof.

In some embodiments, the water-soluble polymer may be modified during the fabrication method to provide the desired adhesion and release properties. The polymer may be treated with a first agent that modifies the water solubility of polymer (i.e., to increase, reduce or substantially eliminate the water solubility). In some embodiments, the water solubility can be restored to that of the original polymer by treatment with a second agent. For example, a polymer including a carboxylate salt having a univalent ion, such as sodium may be soluble in water. But a polymer including a carboxylate salt having a bivalent ion, such as calcium, may be insoluble in water. In one example, if a water-soluble polymer having a sodium carboxylate is treated with calcium ions, such that the side sodium is replaced by calcium, the polymer may be rendered water-insoluble. Alternatively, if a water-insoluble polymer having a calcium carboxylate is treated with sodium ions, such that the side calcium is replaced by sodium, the polymer may be rendered water-soluble. This solubility modification may be achieved by treating the polymer to be modified with an aqueous solution of the replacement salt ion. For example, a water-soluble polymer having sodium carboxylate groups may be rendered water-insoluble by soaking the polymer in an aqueous solution of $CaCl_2$.

The water-soluble polymer may be deposited in a number of different ways. In some embodiments, the water-soluble polymer is deposited by spin-coating. In an example procedure, a pre-polymer solution of polymer in a solvent is spin coated onto the mold surface, followed by removal of the remaining solvent. Removal of the solvent may be accomplished by drying at ambient temperature, elevated temperature, reduced pressure, or a combination thereof. The concentration of the water-soluble polymer in the pre-polymer mixture may depend on the polymer used, and can range from about 1% w/v to about 20% w/v. In some embodiments the concentration is about 1% to about 3%, about 1% to about 5%, about 2% to about 6%, about 2% to about 4%, about 5% to about 10%, about 10% to about 15%, or about 15% to about 20% w/v. The solvent used to make the pre-polymer mixture may be selected to be compatible with the composition of the water-soluble polymer and the composition of the molding piece. The solvent may be an organic solvent, water, or aqueous solution of a salt.

The water-soluble polymer surface layer may be deposited on a mold surface of various compositions known in the art. In some embodiments, the molding piece may be substantially aluminum or aluminum alloy. In other embodiments, the molding piece may include a polymer. In some examples, the molding piece polymer composition is substantially water soluble. In this example, the polymer surface layer may have substantially the same composition as the mold surface, and deposition of a surface layer may be omitted.

The thickness of the water soluble polymer may be modified by repeating the deposition procedure. In other embodiments, the viscosity of the pre-polymer mixture deposited on the mold surface may determine the thickness of the polymer surface layer. The viscosity of the mixture, and therefore the thickness of the resulting polymer layer, may be controlled by modifying the polymer composition, concentration of polymer, type of solvent, and/or composition of additives included in the pre-polymer mixture. The thickness of the water-soluble polymer surface layer may be between about 1 nm and about 100 µm. In some embodiments, the thickness is between about 50 nm and about 10 µm.

In some embodiments, the surface layer may include a surfactant. When the surface layer includes a surfactant, the surface layer may be provided by integrating the surfactant into the molding piece. Thus, the surface layer can be formed on the mold surface when the molding piece is formed, rather than being deposited later.

Suitable surfactants may include amphiphilic organic molecules that are nonionic, anionic, cationic or zwitterionic. A non-limiting list of example surfactants includes monoglycerides, lecithins, glycolipids, fatty alcohols, fatty acids, polysaccharides and sorbitan esters. Stearates may include vegetable based stearic acids, such as palm stearic, sorbitan monostearate, sorbitan distearate, sorbitan tristearate, glycerol monostearate, glycerol distearate, sodium stearate, calcium stearate, magnesium stearate, and mixtures thereof. In some embodiments, the surfactant is glycerol monostearate, glycerol distearate, glycerol tristearate or a combination thereof. Polysorbates include polysorbate 20, polysorbate 40, polysorbate 60, polysorbate 65, polysorbate 80 and mixtures thereof. Fatty alcohols are organic compounds having a long, aliphatic carbon chain and a primary alcohol group. The aliphatic chain is typically a straight chain with no branching, and can have four to 26 carbon atoms. In some instances the fatty alcohol is branched or has unsaturation. Fatty alcohols may include, but are not limited to butenyl alcohol, cetearyl alcohol, cetyl alcohol, isocetyl alcohol, isostearyl alcohol, lauryl alcohol, myristyl alcohol, stearyl alcohol, lanolin alcohol. Fatty acids may include those compounds listed are fatty alcohols where the alcohol functional group is replaced with a carboxylic acid.

In embodiments having a surface layer including a surfactant, the surfactant may be introduced to the mold surface by being incorporated into the molding piece precursor material. For example, during fabrication of a polymeric molding piece, the desired surfactant may be blended with the polymer material and cured to provide a molding piece having an integrated surfactant in the mold surface.

In some embodiments, the surface layers on mold surfaces of molding pieces used to make a molding cavity may be composed of different materials. For example, the first surface layer 310 and second surface layer 312 shown in FIG. 3a may include different water-soluble polymers. In other examples, the first surface layer 310 may include a silane, whereas the second surface layer 312 includes a water-soluble polymer. Other combinations are possible as well. In general, suitable combinations of surface layers may be used to provide desired release conditions for the first polymer layer, partially fabricated device, and fabricated device.

B. Forming a First Polymer Layer

Figure 3B:
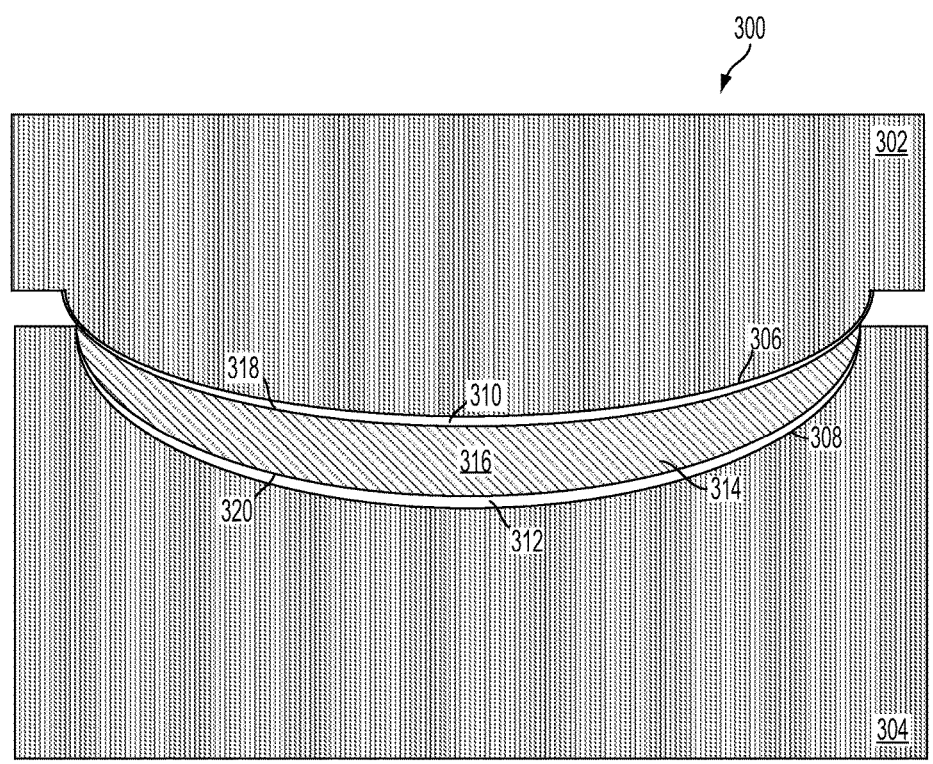
FIG. 3b is an illustration of formation of a first polymer layer, according to an example embodiment.

As mentioned above, at block 102 and 206, the fabrication device may be used to form a first polymer layer. As shown in FIG. 3b, the first molding piece 302 and the second molding piece 304 may define a first cavity there between. A first polymer material 314 may be provided on the second mold surface 308 of the second molding piece 304, and the first polymer material 314 may be compressed into a first polymer layer 316 by the first molding surface 306 of the first molding piece 302. In an example, the first polymer material 314 may be provided between the mold surface 306 of the first molding piece 302 and the second mold surface 308 of the second molding piece 304 by providing the first polymer material 314 on the mold surface 306 of the first molding piece 302.

After the first polymer material 314 is in the first cavity, the fabrication device 300 may cure the first polymer material 314 to provide the first polymer layer 316. In an example, the first polymer material 314 can be a light-curable polymer material, and the fabrication device 300 may be configured to cure the light-curable polymer material using light, such as ultraviolet light or visible light. In an example, the first polymer material 314 may be cured to a partially-cured state. In such an example, this may involve curing the material to a partially-cured state that is approximately 50-75% of a fully cured state. Other partially-cured states are possible as well. Beneficially, by partially curing the first polymer material 314 to a partially-cured state, the first polymer layer 316 may have a tackiness that facilitates adhesion thereto. With this arrangement, the tackiness may facilitate a structure placed on the first polymer layer 316 remaining securely fixed in a given location during subsequent formation steps.

The tackiness exhibited by the partially-cured first polymer layer 316 may be different for different polymers. Accordingly, the fabrication device 300 may be configured to cure different polymer materials differently than other polymer materials (e.g., a first polymer material may be cured more than a second polymer material). Further, in addition to light curing, other methods of curing are possible as well, such as chemical additives and/or heat. For instance, the first polymer material may be cured at a certain temperature, such as between 100 degrees Celsius (C) to 150 degrees C. Yet still further, in other example embodiments, the first polymer material 314 may be completely cured. Alternatively, the fabrication device 300 may bypass curing the first polymer material 314 at this stage.

The first molding piece 302 and the second molding piece 304 may be configured to achieve a given desired thickness of the first polymer layer 316. For instance, in an example, the first polymer layer 316 can have a thickness of less than 150 micrometers. In an example embodiment, the first molding piece 302 and the second molding piece 304 can be designed so as to allow for a layer having less than a 150 micrometer thickness between the two cavities. As such, when the first molding piece 302 and the second molding piece 304 are pressed together during the formation of the first polymer layer 316, the resulting polymer layer 316 will have a thickness of less than 150 micrometers.

In an example, the first polymer material 314 can be any material that can form an eye-compatible polymer layer. For example, the first polymer material 314 may be a formulation containing polymerizable monomers, such as hydrogels, silicone hydrogels, silicone elastomers, and rigid gas permeable materials. Further, the first polymer material 314 may form a transparent or substantially transparent polymer layer. As such, the use of the first polymer material 314 may result in an eye-mountable device through which the wearer can see when mounted on the wearer's eye. In an example, the first polymer material 314 can be a hydrogel material, such as silicone hydrogel. As known in the art, hydrogel materials are commonly used in contact-lens technology and are well-suited for eye-mountable devices. Other materials are possible as well.

In an example, the first molding piece 302 and/or the second molding piece 304 can be configured so as to allow sufficient pinch off to provide for suitable edges for an eye-mountable device.

Further, in an example, the first molding piece 302 and the second molding piece 304 may be transparent, such that the first polymer material 314 may be visible during formation of the first polymer layer 316. Such an arrangement may assist in orienting the first molding piece 302 and/or the second molding piece 304.

The first polymer layer 316 defines a posterior side (or a first side) 318 of an eye-mountable device. That is, the first polymer layer 316 defines an inner edge of the eye-mountable device. When mounted on an eye of a user, the posterior side 318 of the eye-mountable device defined by the first polymer layer 316 corresponds to a side of the device touching the eye of the user. The second molding piece 302 may be shaped so as to define a shape of the posterior side 318. For example, a curvature of the posterior side 318 may be defined by the first molding piece 302. The first polymer layer 316 may also have a side 320 opposite the posterior side 318. The second molding piece 304 may be shaped so as to define a shape of the side 320. For example, a curvature of the side 320 may be defined by the second molding piece 304.

Although FIG. 3b illustrates forming the first polymer layer 316 through cast molding, other methods for forming the first polymer layer 316 are possible as well. For example, the first polymer layer 316 may be formed via injection molding. In injection molding, rather than polymer material being compressed between molding pieces, molding material may be heated and injected or otherwise forced into a molding piece or pieces. The injected molding material may then cool and harden to the configuration of the molding piece or pieces.

As another example, the first polymer layer 316 may be formed via spin casting. Through spin-casting techniques, the fabrication device 300 may form a first polymer layer of a precise thickness. In an example, a spin-casting mold may be spun along its central access at a set speed, and the polymer may be introduced to the mold as the mold is spinning in order to form a first polymer layer. The final thickness of the first polymer layer may be influenced by various factors, including but not limited to the spin-casting mold, the amount of polymer introduced to the spin-casting mold, properties of the polymer such as viscosity, and/or the speed at which the spin-casting mold is rotated. These factors may be varied in order to result in a first polymer layer of a well-defined thickness.

C. Releasing the First Polymer Layer

The first polymer layer 316 may be released from at least one of the first mold surface 306 or second mold surface 308. The first surface layer 310 and/or second surface layer 312 may be selected to facilitate the selective release of the first polymer layer 316 from the first mold surface 306 or the second mold surface 308. For example, the surface layers may be selected to facilitate the selective release of the first polymer layer 316 from the first mold surface 306, so that the first polymer layer 316 remains in contact with the second mold surface 308. Alternatively, the surface layers may be selected to facilitate the selective release of the first polymer layer 316 from the second mold surface 308, so that the first polymer layer 316 remains in contact with the first mold surface 306.

Release from a silane surface layer may include slight mechanical agitation. The amount of mechanical agitation may depend on the critical surface tension of the silane surface layer. In an example, the part may be ejected from the mold surface with a mechanical object (e.g., a rod or pin). In other examples, the molding piece may be inverted. In some embodiments, the polymer layer may be release from the mold surface with a stream of solvent (e.g., water or other aqueous solution) or gas (e.g., air or nitrogen).

Release of the first polymer layer from a water-soluble polymer surface layer or a surface layer including a surfactant may include contact with an aqueous solution. The solution may have a pH between about 6.0 and about 8.0, while in some embodiments the pH of the aqueous solution is between about 1.0 and 6.0, or between about 8.0 and about 12.0. In some embodiments, the aqueous solution in water, distilled water or deionized water. In other embodiments, the aqueous solution is buffered or contains a salt. Contact with the aqueous solution may facilitate dissolution of the water-soluble polymer surface layer and provide release of the first polymer layer from the mold surface.

In some embodiments, the release of the first polymer layer from a water-soluble polymer surface layer may include contact with an aqueous solution through the addition of the solution to the molding cavity or submersion of the fabrication device in the solution. Addition of the solution to the cavity may include pouring, spraying, or drop-wise addition. In embodiments where the fabrication device is submerged in the solution, both molding pieces may be submerged, or only one of the pieces may be submerged. In other examples, the molding pieces may be separated before contact with the aqueous solution. In a specific embodiment where one or more of the molding pieces includes a water soluble polymer, the fabrication device may be contacted with the aqueous solution to facilitate release of the first polymer layer from the mold surface, aided by the concurrent dissolution of the molding piece.

D. Positioning a Structure on the First Polymer Layer

As mentioned above, at block 104 and 210, a structure may be positioned on the first polymer layer. Positioning may be accomplished by a number of methods. For example, the structure may be positioned mechanically, or by use of an apparatus.

In an example, the structure 324 has an outer diameter and a hole 326 that defines an inner diameter. And the structure 324 includes a polymer 328, a sensor 330, and electronics 332. The structure 324 may occupy a peripheral portion of an eye-mountable device, such as an eye-mountable device 400 illustrated in FIG. 4, so as to limit interference with a user's field of view when the eye-mountable device is mounted on an eye of the user. The polymer 328 may comprise a variety of polymeric materials, such as paralyene.

Figure 3C:
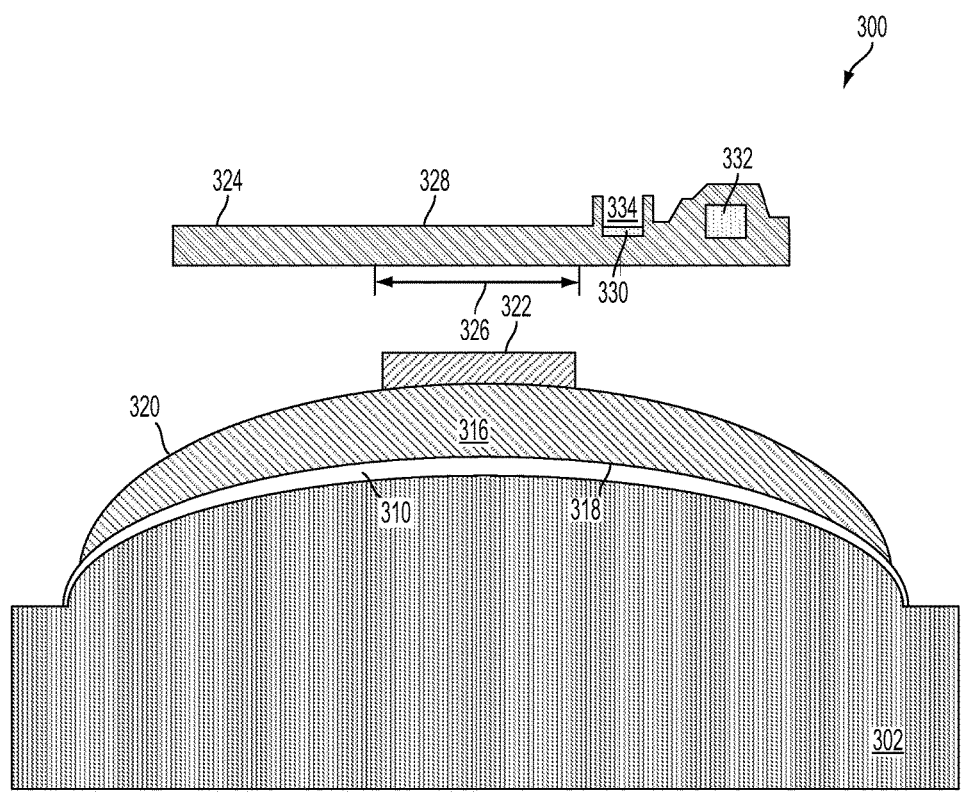
FIG. 3c is an illustration of positioning a structure on a first polymer layer, according to an example embodiment.

In the example illustrated in FIG. 3c, the electronics 332 is embedded in the polymer 328, and the sensor 330 is surrounded by the polymer 328, except for the sensor 330 being exposed by an opening 334. However, in other examples, the sensor 330 and electronics 332 may be mounted on a surface of the polymer 328, such as a top surface of the polymer 328. With this arrangement, the structure 324 might not include the opening 334. In some embodiments, the opening 334 can have a dimension of between 500 to 700 micrometers. Other dimensions are possible as well. And, in some embodiments, the opening 334 can have a square shape with rounded corners. Other shapes are possible as well, such as rectangular, circular, etc.

The structure 324 can have various sizes. For instance, the size of the structure 324 may depend on which analyte (or analytes) an eye-mountable device is configured to detect. In an example, the structure 324 is a substrate shaped as a ring with an outer diameter of approximately a 1 centimeter, a radial thickness of approximately 1 millimeter, and a maximum height of approximately 50 between 150 micrometers. Of course, other sizes of the structure 324 are possible as well.

In an example, the structure 324 has a height dimension of at least 50 micrometers. In other words, at some point of the structure 324, the height of the structure 324 may be at least 50 micrometers. In such an example, this height dimension may correspond to a maximum height of the structure 324. In accordance with this disclosure, the maximum height of the structure 324 corresponds to the height of the structure 324 at its highest point. For instance, in the example where the structure 324 includes the sensor 330 and the electronics 332, the height of the structure 324 may vary (and thus the structure 324 may have various height dimensions). For example, the height of the structure 324 may be higher at a point where the electronics 330 is mounted on the structure 324, whereas the height may be lower at a point where the electronics 330 is not mounted on the structure 324. In such an example, the maximum height may correspond to the point where the electronics 332 is located on the structure 324. Further, in an example, the structure 324 can be more rigid than the first polymer layer 316.

The sensor 330 can be configured in a variety of ways. As one example, the sensor 330 may comprise a pair of electrodes, such as a working electrode and a reference electrode, configured to detect one or more analytes. Other configurations of the sensor 330 are possible as well. And the sensor 330 can have a variety of thicknesses. As one example, the sensor 330 can have a thickness of 260 nanometers. Other thicknesses of the sensor 330 are possible as well.

The electronics 332 can be configured in a variety of ways. As one example, the electronics 332 can comprise a chip including one or more logic elements configured to operate the sensor 330. Other configurations of the electronics 332 are possible as well.

In an example, positioning the structure 324 on the first polymer layer 316 can include aligning the structure 324 with the alignment feature 322. In one example, the hole 326 in the structure 324 has an asymmetric inner diameter and the alignment feature 322 includes an asymmetric peg such that the hole 326 receives the alignment feature 322 in only a predetermined rotational orientation. However, other ways of providing a predetermined rotational orientation of the structure 324 by alignment with the alignment feature 322 are also possible.

Alternatively, the fabrication device 300 can include a positioning apparatus (not shown), such as a robotic system, configured to position the structure 324 on the first polymer layer 316 in a predetermined rotational orientation. For instance, the positioning apparatus may (i) pick up the structure 324 (e.g., via suction), (ii) position the structure 324 above the first polymer layer 316, and then (iii) lower the structure 324 toward the first polymer layer 316. When the structure 324 is positioned in a predetermined rotational orientation, the positioning apparatus may then release the structure 324 (e.g., by releasing the suction). With this approach, the first polymer layer 316 may not include the alignment feature 322.

In some embodiments, the positioning apparatus may bend the structure 324. The structure 324 may be bent in a variety of ways. For instance, the positioning system may be further configured to bend the structure 324. The positioning system may bend the structure 324 by applying a force and/or a torque to one or more portions of the structure 324. As one example, the structure 324 may be bent to a curvature of a side of the first polymer layer, such as the side 320. With this arrangement, positioning the structure 324 onto the first polymer layer 316 may be improved.

The positioning apparatus may further include a vision system configured to assist with positioning the structure 324 on the first polymer layer 316. Such a vision system may facilitate guiding the structure 324 to a precise location on the first polymer layer 316. In an example, the vision system can be appropriate for situations in which one or more production specifications for an eye-mountable device, such the eye-mountable device 400, have requirements with very low tolerances related to the positioning of a sensor, such as the sensor 330, within the eye-mountable device.

During formation of an eye-mountable device, such as the eye-mountable device 400, it may be desirable for the structure 324 to remain in a fixed position during formation of the eye-mountable device. For instance, movement of the structure 324 during subsequent formation steps, such as formation of a second polymer layer, may result in improper placement of the structure 324 relative to the surrounding polymer layers. As one example, movement of the structure 324 during providing a mold surface with a polymer material to form the second polymer layer and/or curing the second polymer layer can result in improper placement of the structure 324 relative to the surrounding polymer layers.

Therefore, in an example, an adhesive is applied to the structure 324 and/or the first polymer layer 316 before the structure 324 is placed on the first polymer layer 316. The applied adhesive may facilitate adhesion of the structure 324 to the first polymer layer 316. For instance, a small amount of adhesive may be applied to a cured first polymer layer 316, and the structure 324 may be positioned on the small amount of adhesive such that the structure 324 adheres to the first polymer layer 316. Additionally or alternatively, a small amount of adhesive may be applied to the structure 324, and the structure 324 may then be placed on the first polymer layer 316 (e.g., a cured first polymer layer) such that the structure 324 adheres to the first polymer layer 316. With this arrangement, the structure 324 may remain adhered to the first polymer layer 316 in a secure location during subsequent formation steps.

As noted above, in an example, the first polymer layer 316 in a partially-cured state may have a tackiness that facilitates adhesion thereto. With this arrangement, the structure 324 may remain adhered to the first polymer layer 316 in a secure location during subsequent formation steps.

In some situations, such as for large-scale production purposes, it may be desirable to not only place the structure 324 in a predetermined rotational orientation, but it may also be desirable to repeatedly place and maintain the structure 324 at this precise location for a plurality of eye-mountable devices. Beneficially, formation of an eye-mountable device in accordance with an example embodiment allows for such repeatable and precise positioning.

Figure 3D:
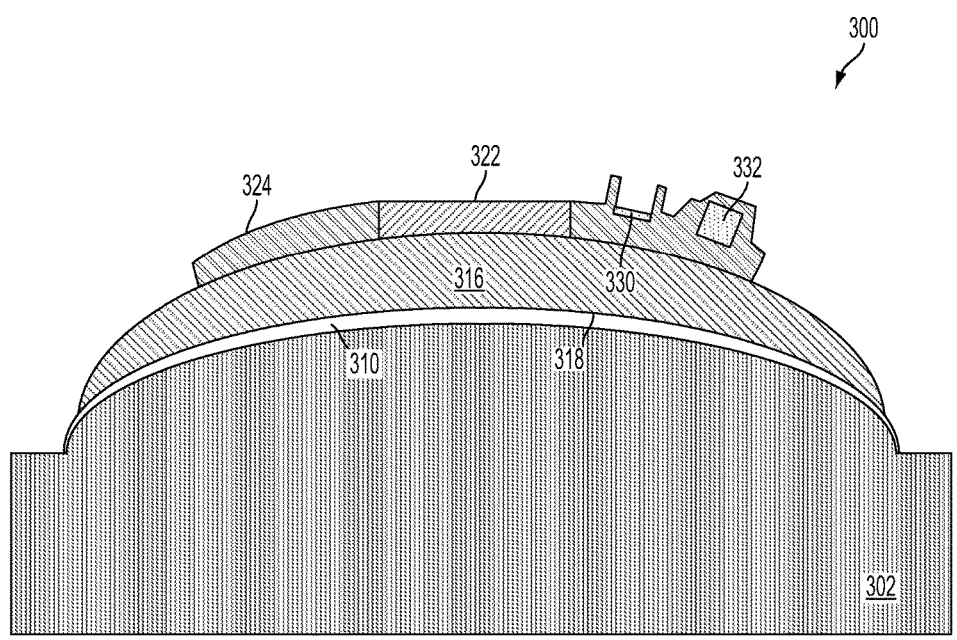
FIG. 3d is an illustration of a structure positioned on a first polymer layer, according to an example embodiment.

FIG. 3d illustrates the structure 324 positioned on the first polymer layer 316. With this arrangement, the sensor 330 may be mounted at a particular angle along a circumference of the first polymer layer 316. As a result, the sensor 330 may be placed at a precise location in an XYZ plane on the first polymer layer 316. As one example, the sensor 330 may rest at a 6 o'clock position of the first polymer layer 330. As another example, the sensor 330 may rest at a 12 o'clock position of the first polymer layer 316.

Figure 3E:
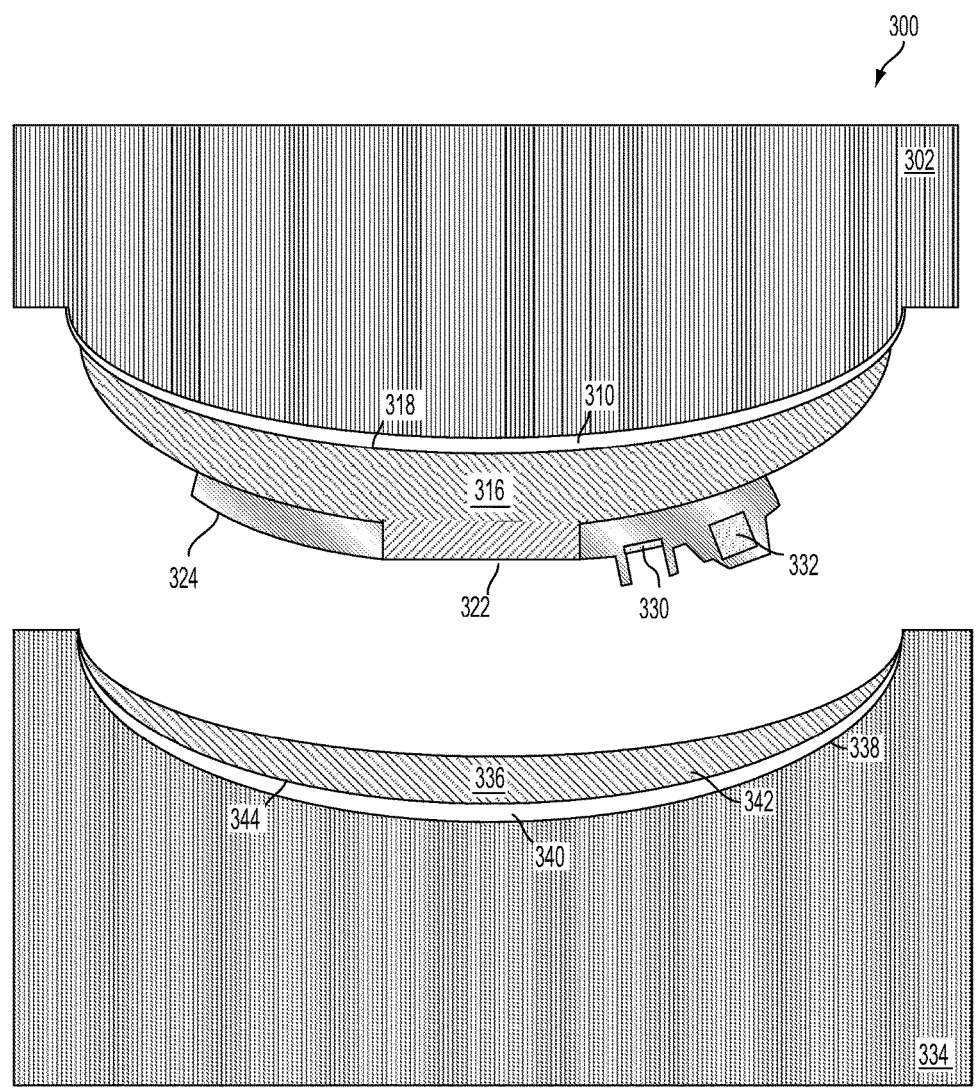
FIG. 3e is an illustration of bringing molding pieces together into a forming position, according to an example embodiment.
Figure 3F:
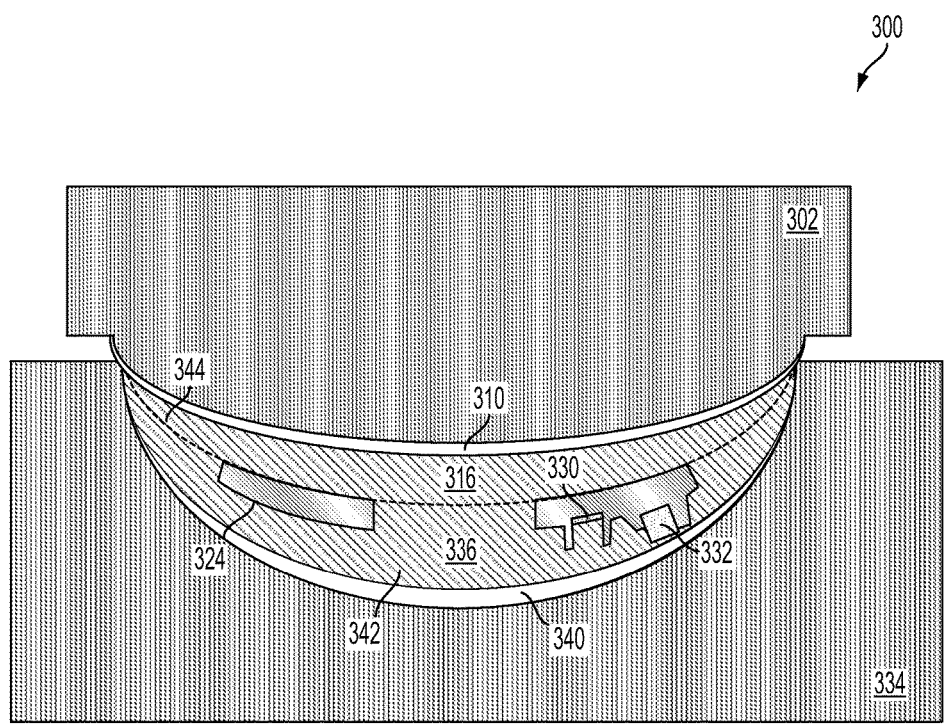
FIG. 3f is an illustration of in the forming position, curing the polymer material to form a second polymer layer, according to an example embodiment.

E. Forming a Second Polymer Layer Over the First Polymer Layer and the Structure As mentioned above, at block 106 and 212, the fabrication device may form a second polymer layer between the first polymer layer 316 and the third mold surface 338 of the third molding piece 334, such that the structure is fully enclosed by the first polymer layer 316 and the second polymer layer 336. FIG. 3e illustrates the fabrication device 300 including molding pieces that may be used to form the second polymer layer 336. The third molding piece 334 may be as described for the first or second molding pieces described above, and may have a third surface layer 340 provided on a third mold surface 338. In some embodiments, the third molding piece may be used in combination with the first molding piece 302 in the formation of the second polymer layer, and may therefore have a shape that is substantially concave. In other embodiments, the third molding piece may be used in combination with the second molding piece 304 in the formation of the second polymer layer, and may therefore have a shape that is substantially convex. In some embodiments, the first molding piece 302 and the third molding piece 334 may define a second cavity. In other embodiments, the second molding piece 304 and the third molding piece 334 may define a second cavity. In a particular example, FIG. 3e illustrates a third molding piece 334 having a third surface layer 340 on the third mold surface 338, and the third molding piece 334 is used in combination with the first molding piece 302.

The structure 330 mounted on the first polymer layer 316 may define a partially-fabricated device (as illustrated in FIG. 3d). In order to form the second polymer layer 336, the partially-fabricated device 368 may be placed in the second cavity defined by the first molding piece 302 and the third molding piece 334. After the partially-fabricated device is placed in the second cavity, the second cavity may be filled with a polymer material 342. In some embodiments, the polymer material 342 may be formed into a second polymer layer 336 by compression between the first molding piece 302 and the third molding piece 334. In other embodiments, not illustrated in FIG. 3e, the polymer material 342 may be formed into a second polymer layer 316 by compression between the second molding piece 304 and the third molding piece 334. As a result, the second polymer layer 336 may mold over the structure 330, such that the structure 330 is fully enclosed by the first polymer layer 316 and the second polymer layer 336.

In another example, the partially-fabricated device may be released from the first or second mold surface and positioned on the fourth mold surface of a fourth molding piece. The fourth molding piece and third molding piece may define a third molding cavity, which may be filled with polymer material to provide the second polymer layer. The fourth molding piece may include a fourth surface layer on the fourth mold surface that facilitates release of the fabricated device from the fourth mold surface. The fourth and third surface layers may be selected from the surface layer described above to facilitate the selective release of the fabricated device from third or fourth mold surface. Positioning of the partially-fabricated device on the fourth mold surfaces may be accomplished using methods described above for positioning the structure on the first polymer layer.

Figure 4:
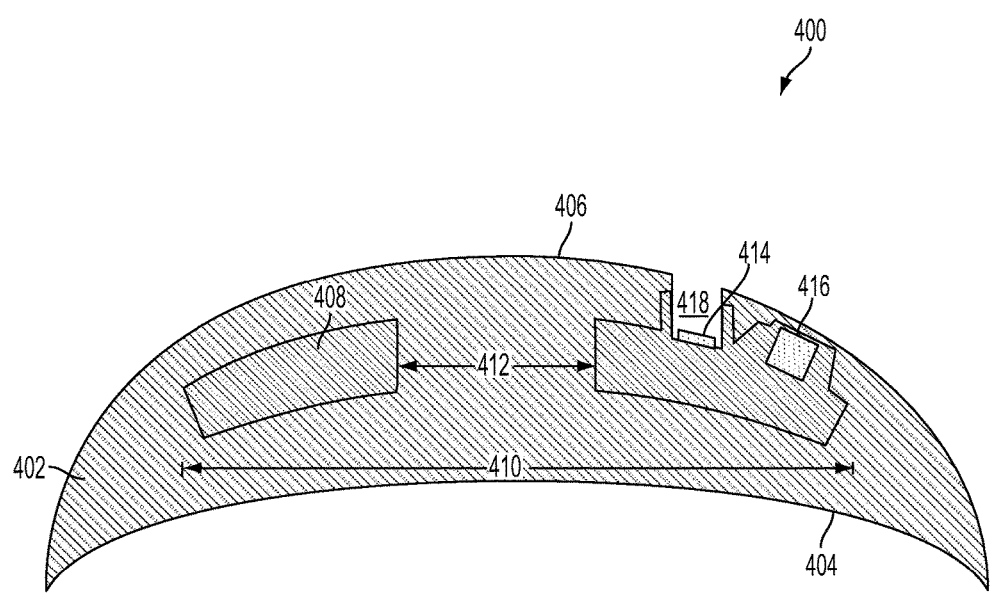
FIG. 4 is an illustration of an eye-mountable device fabricated according to an example embodiment.

After the second polymer material 342 is provided, curing may provide the fabricated body-mountable device, such as the device 400 illustrated in FIG. 4. In an example, illustrated in FIG. 3f, the second polymer layer material 342 can be cured like the first polymer layer material 314. However, in other examples, the second polymer material 342 may be cured by different techniques than the first polymer material 314. The second polymer material 342 can be cured by any of the techniques mentioned herein. In an example, the fabrication device 300 may concurrently cure the partially-cured first polymer material 314 and the second polymer material 342.

After the second polymer material 342 is cured, there may not be the visible boundary line 342 separating the first polymer layer 316 from the second polymer layer 336. For example, FIG. 4 illustrates the fabricated eye-mountable device 400. In particular, FIG. 4 illustrates the eye-mountable device 400 includes a transparent polymer 402. The transparent polymer 402 can be arranged like the first polymer layer 316 and the second polymer layer 336.

The fabrication device 300 may further include one or more alignment pins, such as a plurality of dowel pins, for aligning the molding pieces that form the second or third molding cavities. The one or more alignment pins can assist in forming the second polymer layer 336 by aligning the molding pieces that form the second or third molding cavities.

The molding pieces that form the second or third molding cavities may be configured to achieve a given desired thickness of a layer formed between the two pieces. As one example, the molding pieces may be designed so as to define a thickness of the second polymer layer 336. As another example, the molding pieces may be designed so as to define a final thickness of an eye-mountable device, such as the eye-mountable device 400. In an example, the molding pieced can be designed so as to allow for a layer having a given desired thickness between the two pieces (in addition to a thickness of the first polymer 316). As such, when the molding pieced are pressed together during formation of a layer, the resulting layer will have the given desired thickness.

In an example, the second polymer layer 336 has a thickness of greater than 50 micrometers. However, in other examples, the second polymer layer 336 can have a thickness between 50 and 300 micrometers, such as 130 micrometers. It should be understood that since the second polymer layer 336 molds over the structure 330, the second polymer layer 336 may not have a uniform thickness. For instance, the thickness of the second polymer layer 336 above the sensor 330 may be less than the thickness of the second polymer layer 336 that is not touching the sensor 330.

In an example, the thickness of the second polymer layer 336 can be selected based on a particular analyte or analytes that the eye-mountable device, such as the eye-mountable device 400, is configured to detect. For example, an optimal thickness for a first analyte may be 10 micrometers, while an optimal thickness for a second analyte may be 25 micrometers. Other examples are possible as well.

In an example, the second polymer layer 336 can be composed of the same polymer material as the first polymer layer 316. However, in other examples, the second polymer layer 336 can be composed of a different polymer material than the first polymer layer 316. The second polymer layer 336 can be any one of the polymer materials mentioned herein. In an example, the structure 330 can be more rigid than the second polymer layer 336.

The second polymer layer 336 defines an anterior side 346 (or second side) of an eye-mountable device. That is, the second polymer layer 336 defines an outer edge of the eye-mountable device. When mounted on an eye of a user, the anterior side 346 of the eye-mountable device defined by the second polymer layer 336 corresponds to the side of the device that is not touching the eye of the user. The third molding piece 334 may be shaped so as to define a shape of the anterior side 346. For example, a curvature of the anterior side 346 may be defined by the fourth molding piece 334.

Although the method 100 and the method 200 were described above with respect to the structure 330, in other examples the structure might not include a ring-shaped substrate. Instead, the structure may include an electronic component, such as a light emitting diode (LED). With this arrangement, embodiments described herein may allow for such a structure to be positioned at a predetermined location on the first polymer layer 316, such as at a center of the first polymer layer 316. For instance, the apparatus for placing the structure 324 may be configured to position the structure at the predetermined location on the first polymer layer 316.

Figure 3G:
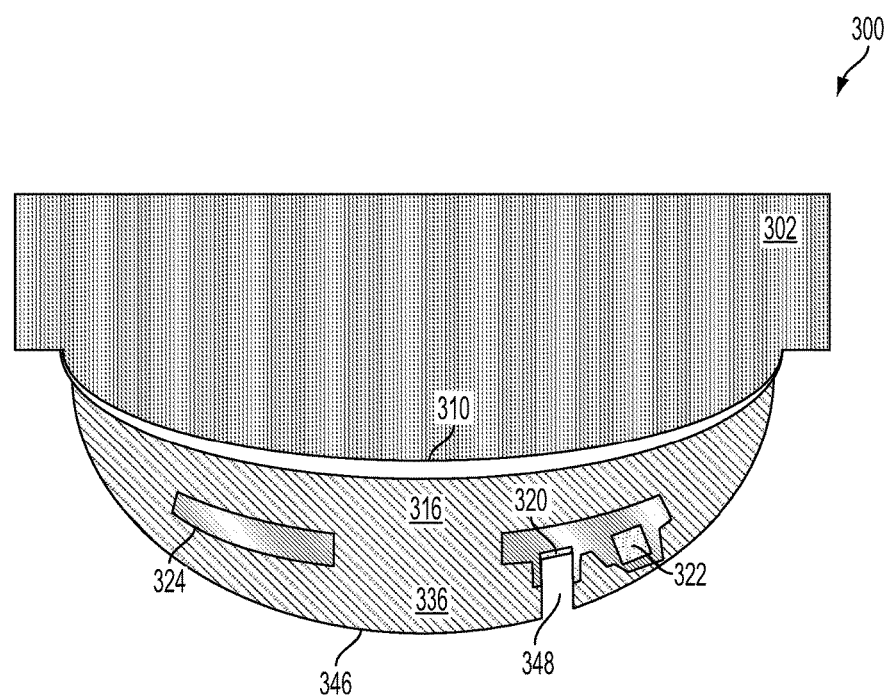
FIG. 3g is an illustration of an eye-mountable device remaining on a molding piece, following release of the eye-mountable device from another molding piece.

The methods 100 and 200 may further involve forming a channel to the sensor 330, such that the sensor 330 is configured to receive one or more analytes via the channel 348, as illustrated by device 300 in FIG. 3g. The channel 348 could be formed in a variety of ways. As one example, the channel 348 may be formed by removing material from the second polymer layer 336. The material from the second polymer layer 336 may be removed to form the channel 348 in a variety of ways. For instance, the material from the second polymer layer 336 may be removed to form the channel 348 via a process that includes drilling, ablation, etching, etc.

As another example, a mask layer may be formed over sensor 333 before forming the second polymer layer 336. With this arrangement, the second polymer layer 336 may mold over the mask layer. In some situations, the mask layer may take the shape of the channel 348 to the sensor 330. Further, in such an example, the mask layer may be removed to form the channel 348 to the sensor 330. The mask layer may be removed in a variety of ways. For instance, the mask layer may be removed via a process that includes etching the mask layer, dissolving the mask layer in a fluid, and/or soaking the mask layer in a fluid. In some embodiments, soaking the mask layer in a fluid causes it to swell (i.e., increase in volume) so that it ejects or is easily removed from the channel 348 to the sensor 330.

As still another example, the channel 348 may be molded. For instance, the second polymer layer 336 may be formed in a molding cavity that includes a protrusion that extends from a mold surface to the sensor 330 through the second polymer layer 336 as the second polymer layer 336 is being formed. With this arrangement, the protrusion may form the channel 348 to the sensor 330.

F. Releasing the Device from the Second Mold Cavity

As mentioned above, at block 108 and 214, the eye-mountable device may be released from at least one of the mold surfaces. FIG. 3g illustrates the fabrication device 300 provided when the eye-mountable device is released from the mold surface 338 of the molding piece 334 and remains with the molding piece 302.

In some embodiments, release of the eye-mountable device from a mold surface having a surface layer including a silane is performed as described above for the release of the first polymer layer from a mold surface having a surface layer including a silane.

In some embodiments, release of the eye-mountable device from a mold surface having a surface layer including a water-soluble polymer is performed as described above for the release of the first polymer layer from a mold surface having a surface layer including a water-soluble polymer.

In some embodiments, release of the eye-mountable device from a mold surface including a surfactant is performed as described above for the release of the first polymer layer from a mold surface including a surfactant.

IV. EXAMPLE SYSTEMS, AND DEVICES

A. Eye-Mountable Device

As mentioned above, FIG. 4 illustrates the eye-mountable device 400 formed according to an example embodiment. In the eye-mountable device 400, a structure 408 is embedded in the transparent polymer 402. In some examples, the structure 408 may be embedded in the transparent polymer 402 in a predetermined orientation, such as centered in the transparent polymer 402. As shown, the structure 408 has an outer diameter 410 and an inner diameter 412.

The structure 408 includes a sensor 414 configured to detect an analyte and electronics 416. The eye-mountable device 400 includes a posterior side 404 and an anterior side 406. The transparent polymer 402 may take the form of or be similar in form to the first polymer layer 316 and the second polymer layer 376, the structure 408 may take the form of or be similar in form to the structure 330, the sensor 414 may take the form of or be similar in form to the sensor 336, and the electronics 416 may take the form of or be similar in form to the electronics 338.

In an example, the sensor 414 may be configured to receive the analyte via a channel 418 in the transparent polymer 402. With this arrangement, the structure 408 is fully enclosed by the transparent polymer 402, except for the sensor 414 being exposed by the channel 418.

In some examples, one or more dimensions of the channel 418 may be based on one or more dimensions of the sensor 414 and/or the electronics 416. As one example, a width of the channel 418 can be based on a width of the sensor 414. As another example, a height of the channel 418 can be based on a height of the electronics 416.

While the body-mountable device has been described as comprising the eye-mountable device 400, the body-mountable device could comprise other mountable devices that are mounted on or in other portions of the human body.

For example, in some embodiments, the body-mountable device may comprise a tooth-mountable device. In some embodiments, the tooth-mountable device may take the form of or be similar in form to the eye-mountable device 400. For instance, the tooth-mountable device may include polymer layers and/or a transparent polymer that are the same or similar to any of the polymer layers and/or transparent polymers described herein and a structure that is the same or similar to any of the structures described herein. With this arrangement, the tooth-mountable device may be configured to detect at least one analyte in a fluid (e.g., saliva) of a user wearing the tooth-mountable device.

Moreover, in some embodiments, the body-mountable device may comprise a skin-mountable device. In some embodiments, the skin-mountable device may take the form of or be similar in form to the eye-mountable device 400. For instance, the tooth-mountable device may include polymer layers and/or a transparent polymer that are the same or similar to any of the polymer layers and/or transparent polymers described herein and a structure that is the same or similar to any of the structures described herein. With this arrangement, the skin-mountable device may be configured to detect at least one analyte in a fluid (e.g., perspiration, blood, etc.) of a user wearing the skin-mountable device.

Further, some embodiments may include privacy controls which may be automatically implemented or controlled by the wearer of a body-mountable device. For example, where a wearer's collected physiological parameter data and health state data are uploaded to a cloud computing network for trend analysis by a clinician, the data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined.

Additionally or alternatively, wearers of a body-mountable device may be provided with an opportunity to control whether or how the device collects information about the wearer (e.g., information about a user's medical history, social actions or activities, profession, a user's preferences, or a user's current location), or to control how such information may be used. Thus, the wearer may have control over how information is collected about him or her and used by a clinician or physician or other user of the data. For example, a wearer may elect that data, such as health state and physiological parameters, collected from his or her device may only be used for generating an individual baseline and recommendations in response to collection and comparison of his or her own data and may not be used in generating a population baseline or for use in population correlation studies.

B. Example System and Devices

As mentioned above, a body-mountable device may be formed using the example methods described above. Further, the body-mountable device may be configured to monitor health-related information based on at least one analyte detected in a fluid of a user wearing the body-mountable device. An eye-mountable device configured to monitor health-related information based on at least one analyte detected from an eye of a user is described in greater detail below with reference to FIGS. 5 and 6a-6d.

A structure in accordance with an example embodiment may include a sensor, electronics, and an antenna all situated on a substrate. The electronics may operate the sensor to perform readings and operate the antenna to wirelessly communicate the readings from the sensor to an external reader via the antenna. The sensor can be arranged on the substrate to face outward, away from the corneal surface of the user, so as to generate clinically relevant readings from tear fluid of the user that the sensor receives via a channel in the anterior side of the eye-mountable device. For example, the sensor can be suspended in the lens material and situated such that the sensor is less than 10 micrometers from the anterior edge of the eye-mountable device. The sensor can generate an output signal indicative of a concentration of an analyte that the sensor receives via the channel.

Figure 5:
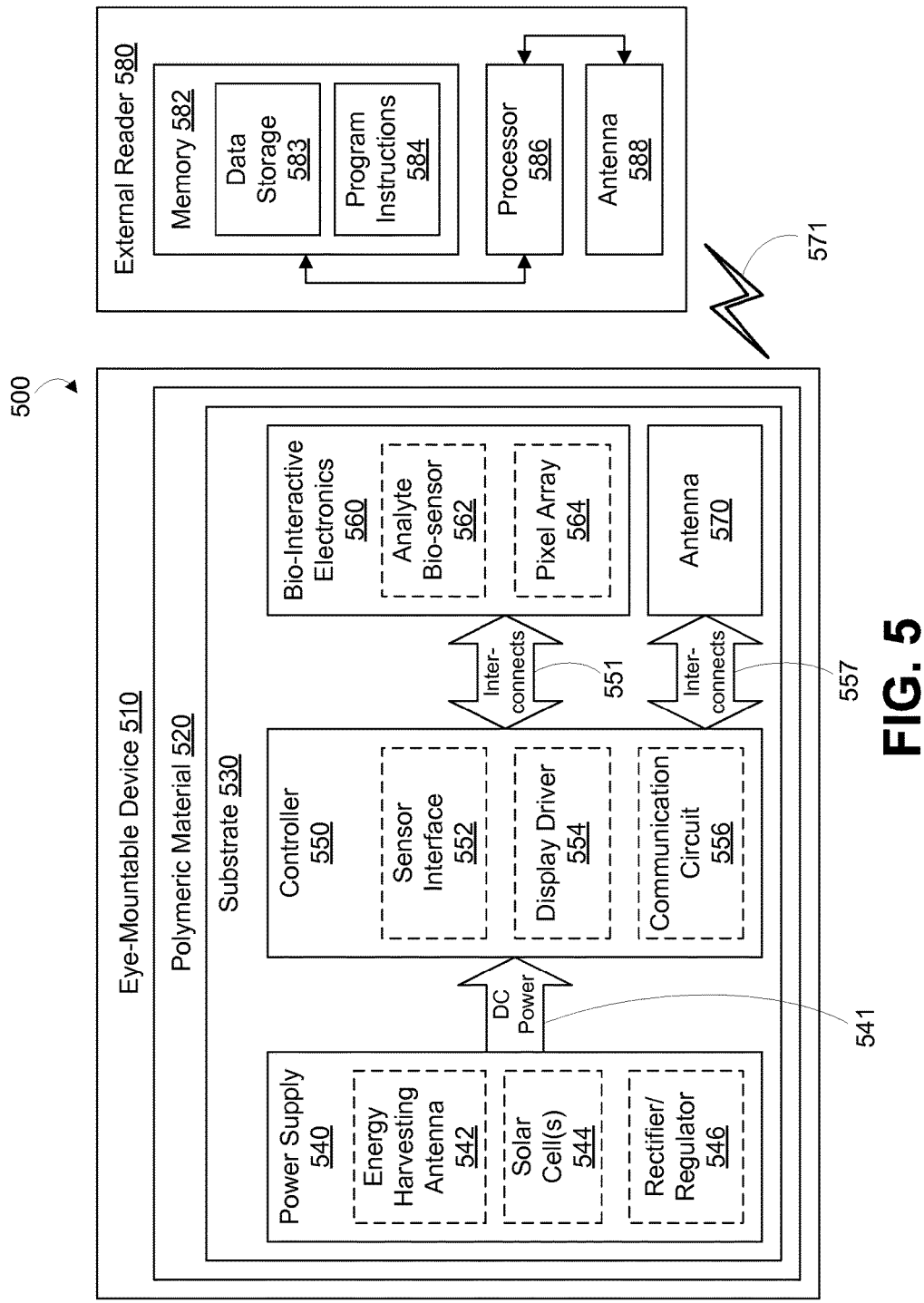
FIG. 5 is a block diagram of a system with an eye-mountable device in wireless communication with an external reader, according to an example embodiment.

FIG. 5 is a block diagram of a system 500 with an eye-mountable device 510 in wireless communication with an external reader 580. The exposed regions of the eye-mountable device 510 are made of a polymeric material 520 formed to be contact-mounted to a corneal surface of an eye. In accordance with the exemplary methods, polymeric material 520 may comprise a first polymer layer and a second polymer layer.

Substrate 530 is embedded in the polymeric material 520 to provide a mounting surface for a power supply 540, a controller 550, bio-interactive electronics 560, and an antenna 570. The bio-interactive electronics 560 are operated by the controller 550. The power supply 540 supplies operating voltages to the controller 550 and/or the bio-interactive electronics 560. The antenna 570 is operated by the controller 550 to communicate information to and/or from the eye-mountable device 510. The antenna 570, the controller 550, the power supply 540, and the bio-interactive electronics 560 can all be situated on the embedded substrate 530. Because the eye-mountable device 510 includes electronics and is configured to be contact-mounted to an eye, it may also be referred to as an ophthalmic electronics platform.

To facilitate contact-mounting, the polymeric material 520 can have a concave surface configured to adhere ("mount") to a moistened corneal surface (e.g., by capillary forces with a tear film coating the corneal surface). Additionally or alternatively, the eye-mountable device 510 can be adhered by a vacuum force between the corneal surface and the polymeric material due to the concave curvature. While mounted with the concave surface against the eye, the anterior or outward-facing surface of the polymeric material 520 can have a convex curvature that is formed to not interfere with eye-lid motion while the eye-mountable device 510 is mounted to the eye. For example, the polymeric material 520 can be a substantially transparent curved polymeric disk shaped similarly to a contact lens.

The polymeric material 520 can include one or more biocompatible materials, such as those employed for use in contact lenses or other ophthalmic applications involving direct contact with the corneal surface. The polymeric material 520 can optionally be formed in part from such biocompatible materials or can include an outer coating with such biocompatible materials. The polymeric material 520 can include materials configured to moisturize the corneal surface, such as hydrogels and the like. In some instances, the polymeric material 520 can be a deformable ("non-rigid") material to enhance wearer comfort. In some instances, the polymeric material 520 can be shaped to provide a predetermined, vision-correcting optical power, such as can be provided by a contact lens.

The substrate 530 includes one or more surfaces suitable for mounting the bio-interactive electronics 560, the controller 550, the power supply 540, and the antenna 570. The substrate 530 can be employed both as a mounting platform for chip-based circuitry (e.g., by flip-chip mounting) and/or as a platform for patterning conductive materials (e.g., gold, platinum, palladium, titanium, copper, aluminum, silver, metals, other conductive materials, combinations of these, etc.) to create electrodes, interconnects, antennae, etc. In some embodiments, substantially transparent conductive materials (e.g., indium tin oxide) can be patterned on the substrate 530 to form circuitry, electrodes, etc. For example, the antenna 570 can be formed by depositing a pattern of gold or another conductive material on the substrate 530. Similarly, interconnects 551, 557 between the controller 550 and the bio-interactive electronics 560, and between the controller 550 and the antenna 570, respectively, can be formed by depositing suitable patterns of conductive materials on the substrate 530. A combination of resists, masks, and deposition techniques can be employed to pattern materials on the substrate 530.

The substrate 530 can be a relatively rigid polymeric material, such as PET, paralyene or another material sufficient to structurally support the circuitry and/or electronics within the polymeric material 520. The eye-mountable device 510 can alternatively be arranged with a group of unconnected substrates rather than a single substrate. For example, the controller 550 and a bio-sensor or other bio-interactive electronic component can be mounted to one substrate, while the antenna 570 is mounted to another substrate and the two can be electrically connected via the interconnects 557.

In some embodiments, the bio-interactive electronics 560 (and the substrate 530) can be positioned away from the center of the eye-mountable device 510 and thereby avoid interference with light transmission to the eye through the center of the eye-mountable device 510. For example, where the eye-mountable device 510 is shaped as a concave-curved disk, the substrate 530 can be embedded around the periphery (e.g., near the outer circumference) of the disk. In some embodiments, the bio-interactive electronics 560 (and the substrate 530) can be positioned in the center region of the eye-mountable device 510. The bio-interactive electronics 560 and/or the substrate 530 can be substantially transparent to incoming visible light to mitigate interference with light transmission to the eye. Moreover, in some embodiments, the bio-interactive electronics 560 can include a pixel array 564 that emits and/or transmits light to be perceived by the eye according to display driver instructions. Thus, the bio-interactive electronics 560 can optionally be positioned in the center of the eye-mountable device so as to generate perceivable visual cues to a wearer of the eye-mountable device 510, such as by displaying information via the pixel array 564.

The substrate 530 can be shaped as a flattened ring with a radial width dimension sufficient to provide a mounting platform for the embedded electronics components. The substrate 530 can have a thickness sufficiently small to allow the substrate 530 to be embedded in the polymeric material 520 without influencing the profile of the eye-mountable device 510. The substrate 530 can have a thickness sufficiently large to provide structural stability suitable for supporting the electronics mounted thereon. For example, the substrate 530 can be shaped as a ring with a diameter of about 10 millimeters, a radial width of about 1 millimeter (e.g., an outer radius 1 millimeter larger than an inner radius), and a thickness of about 50 micrometers. The substrate 530 can optionally be aligned with the curvature of the anterior side of the eye-mountable device.

The power supply 540 is configured to harvest ambient energy to power the controller 550 and bio-interactive electronics 560. For example, a radio-frequency energy harvesting antenna 542 can capture energy from incident radio radiation. Additionally or alternatively, solar cell(s) 544 ("photovoltaic cells") can capture energy from incoming ultraviolet, visible, and/or infrared radiation. Furthermore, an inertial power scavenging system can be included to capture energy from ambient vibrations. The energy harvesting antenna 542 can optionally be a dual-purpose antenna that is also used to communicate information to the external reader 580. That is, the functions of the antenna 570 and the energy harvesting antenna 542 can be accomplished with the same physical antenna.

A rectifier/regulator 546 can be used to condition the captured energy to a stable DC supply voltage 541 that is supplied to the controller 550. For example, the energy harvesting antenna 542 can receive incident radio frequency radiation. Varying electrical signals on the leads of the antenna 542 are output to the rectifier/regulator 546. The rectifier/regulator 546 rectifies the varying electrical signals to a DC voltage and regulates the rectified DC voltage to a level suitable for operating the controller 550. Additionally or alternatively, output voltage from the solar cell(s) 544 can be regulated to a level suitable for operating the controller 550. The rectifier/regulator 546 can include one or more energy storage devices arranged to mitigate high frequency variations in the ambient energy harvesting antenna 542 and/or solar cell(s) 544. For example, an energy storage device (e.g., capacitor, inductor, etc.) can be connected to the output of the rectifier/regulator 546 so as to function as a low-pass filter.

The controller 550 is turned on when the DC supply voltage 541 is provided to the controller 550, and the logic in the controller 550 operates the bio-interactive electronics 560 and the antenna 570. The controller 550 can include logic circuitry configured to operate the bio-interactive electronics 560 so as to interact with a biological environment of the eye-mountable device 510. The interaction could involve the use of one or more components, such as an analyte bio-sensor 562, in bio-interactive electronics 560 to obtain input from the biological environment. Alternatively or additionally, the interaction could involve the use of one or more components, such as the pixel array 564, to provide an output to the biological environment.

In one example, a sensor interface module 552 can be included for operating the analyte bio-sensor 562. The analyte bio-sensor 562 can be, for example, an amperometric electrochemical sensor that includes a working electrode and a reference electrode. Application of an appropriate voltage between the working and reference electrodes can cause an analyte to undergo electrochemical reactions (e.g., reduction and/or oxidation reactions) at the working electrode to generate an amperometric current. The amperometric current can be dependent on the analyte concentration, and thus the amount of amperometric current can provide an indication of analyte concentration. In some embodiments, the sensor interface module 552 can be a potentiostat configured to apply a voltage difference between the working and reference electrodes while measuring a current through the working electrode.

In some instances, a reagent can also be included to sensitize the electrochemical sensor to desired analytes. For example, a layer of glucose oxidase ("GOX") can be situated around the working electrode to catalyze glucose into hydrogen peroxide ($H_2O_2$). The hydrogen peroxide can then be oxidized at the working electrode, which releases electrons to the working electrode, which generates a current.

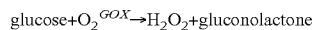

$$glucose + O_2 \xrightarrow{GOX} H_2O_2 + gluconolactone$$

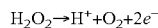

$$H_2O_2 \rightarrow H^+ + O_2 + 2e^-$$

The current generated by either reduction or oxidation reactions can be approximately proportionate to the reaction rate. Further, the reaction rate can be dependent on the rate of analyte molecules reaching the electrochemical sensor electrodes to fuel the reduction or oxidation reactions, either directly or catalytically through a reagent. In a steady state, where analyte molecules diffuse to the electrochemical sensor electrodes from a sampled region at approximately the same rate that additional analyte molecules diffuse to the sampled region from surrounding regions, the reaction rate can be approximately proportionate to the concentration of the analyte molecules. The current can thus provide an indication of the analyte concentration.

The controller 550 can optionally include a display driver module 554 for operating the pixel array 564. The pixel array 564 can be an array of separately programmable light transmitting, light reflecting, and/or light emitting pixels arranged in rows and columns. The individual pixel circuits can optionally include liquid crystal technologies, microelectromechanical technologies, emissive diode technologies, etc. to selectively transmit, reflect, and/or emit light according to information from the display driver module 554. Such a pixel array 564 can also optionally include more than one color of pixels (e.g., red, green, and blue pixels) to render visual content in color. The display driver module 554 can include, for example, one or more data lines providing programming information to the separately programmed pixels in the pixel array 564 and one or more addressing lines for setting groups of pixels to receive such programming information. Such a pixel array 564 situated on the eye can also include one or more lenses to direct light from the pixel array to a focal plane perceivable by the eye.

The controller 550 can also include a communication circuit 556 for sending and/or receiving information via the antenna 570. The communication circuit 556 can optionally include one or more oscillators, mixers, frequency injectors, etc. to modulate and/or demodulate information on a carrier frequency to be transmitted and/or received by the antenna 570. In some examples, the eye-mountable device 510 is configured to indicate an output from a bio-sensor by modulating an impedance of the antenna 570 in a manner that is perceivable by the external reader 580. For example, the communication circuit 556 can cause variations in the amplitude, phase, and/or frequency of backscatter radiation from the antenna 570, and such variations can be detected by the external reader 580.

The controller 550 is connected to the bio-interactive electronics 560 via interconnects 551. For example, where the controller 550 includes logic elements implemented in an integrated circuit to form the sensor interface module 552 and/or display driver module 554, a patterned conductive material (e.g., gold, platinum, palladium, titanium, copper, aluminum, silver, metals, combinations of these, etc.) can connect a terminal on the chip to the bio-interactive electronics 560. Similarly, the controller 550 is connected to the antenna 570 via interconnects 557.

It is noted that the block diagram shown in FIG. 5 is described in connection with functional modules for convenience in description. However, embodiments of the eye-mountable device 510 can be arranged with one or more of the functional modules ("sub-systems") implemented in a single chip, integrated circuit, and/or physical feature. For example, while the rectifier/regulator 546 is illustrated in the power supply block 540, the rectifier/regulator 546 can be implemented in a chip that also includes the logic elements of the controller 550 and/or other features of the embedded electronics in the eye-mountable device 510. Thus, the DC supply voltage 541 that is provided to the controller 550 from the power supply 540 can be a supply voltage that is provided on a chip by rectifier and/or regulator components of the same chip. That is, the functional blocks in FIG. 5 shown as the power supply block 540 and controller block 550 need not be implemented as separated modules. Moreover, one or more of the functional modules described in FIG. 5 can be implemented by separately packaged chips electrically connected to one another.

Additionally or alternatively, the energy harvesting antenna 542 and the antenna 570 can be implemented with the same physical antenna. For example, a loop antenna can both harvest incident radiation for power generation and communicate information via backscatter radiation.

The external reader 580 includes an antenna 588 (or group of more than one antennae) to send and receive wireless signals 571 to and from the eye-mountable device 510. The external reader 580 also includes a computing system with a processor 586 in communication with a memory 582. The memory 582 is a non-transitory computer-readable medium that can include, without limitation, magnetic disks, optical disks, organic memory, and/or any other volatile (e.g., RAM) or non-volatile (e.g., ROM) storage system readable by the processor 586. The memory 582 can include a data storage 583 to store indications of data structures, such as sensor readings (e.g., from the analyte bio-sensor 562), program settings (e.g., to adjust behavior of the eye-mountable device 510 and/or external reader 580), etc. The memory can also include program instructions 584 for execution by the processor 586 to cause the external reader to perform processes specified by the program instructions 584. For example, the program instructions 584 can cause external reader 580 to provide a user interface that allows for retrieving information communicated from the eye-mountable device 510 (e.g., sensor outputs from the analyte bio-sensor 562). The external reader 580 can also include one or more hardware components for operating the antenna 588 to send and receive the wireless signals 571 to and from the eye-mountable device 510. For example, oscillators, frequency injectors, encoders, decoders, amplifiers, filters, etc. can drive the antenna 588 according to instructions from the processor 586.

The external reader 580 can be a smart phone, digital assistant, or other portable computing device with wireless connectivity sufficient to provide the wireless communication link 571. The external reader 580 can also be implemented as an antenna module that can be plugged in to a portable computing device, such as in an example where the communication link 571 operates at carrier frequencies not commonly employed in portable computing devices. In some instances, the external reader 580 is a special-purpose device configured to be worn relatively near a wearer's eye to allow the wireless communication link 571 to operate with a low power budget. For example, the external reader 580 can be integrated in eyeglasses, integrated in a piece of jewelry such as a necklace, earring, etc., or integrated in an article of clothing worn near the head, such as a hat, headband, etc.

In an example where the eye-mountable device 510 includes an analyte bio-sensor 562, the system 500 can be operated to monitor the analyte concentration in tear film on the surface of the eye. Thus, the eye-mountable device 510 can be configured as a platform for an ophthalmic analyte bio-sensor. The tear film is an aqueous layer secreted from the lacrimal gland to coat the eye. The tear film is in contact with the blood supply through capillaries in the structure of the eye and includes many biomarkers found in blood that are analyzed to characterize a person's health condition(s). For example, the tear film includes glucose, calcium, sodium, cholesterol, potassium, other biomarkers, etc. The biomarker concentrations in the tear film can be systematically different than the corresponding concentrations of the biomarkers in the blood, but a relationship between the two concentration levels can be established to map tear film biomarker concentration values to blood concentration levels. For example, the tear film concentration of glucose can be established (e.g., empirically determined) to be approximately one tenth the corresponding blood glucose concentration. Thus, measuring tear film analyte concentration levels provides a non-invasive technique for monitoring biomarker levels in comparison to blood sampling techniques performed by lancing a volume of blood to be analyzed outside a person's body. Moreover, the ophthalmic analyte bio-sensor platform disclosed here can be operated substantially continuously to enable real time monitoring of analyte concentrations.

To perform a reading with the system 500 configured as a tear film analyte monitor, the external reader 580 can emit radio frequency radiation 571 that is harvested to power the eye-mountable device 510 via the power supply 540. Radio frequency electrical signals captured by the energy harvesting antenna 542 (and/or the antenna 570) are rectified and/or regulated in the rectifier/regulator 546 and a regulated DC supply voltage 541 is provided to the controller 550. The radio frequency radiation 571 thus turns on the electronic components within the eye-mountable device 510. Once turned on, the controller 550 operates the analyte bio-sensor 562 to measure an analyte concentration level. For example, the sensor interface module 552 can apply a voltage between a working electrode and a reference electrode in the analyte bio-sensor 562 sufficient to cause the analyte to undergo an electrochemical reaction at the working electrode. The current through the working electrode can be measured to provide the sensor output indicative of the analyte concentration. The controller 550 can operate the antenna 570 to communicate the sensor results back to the external reader 580 (e.g., via the communication circuit 556). The sensor result can be communicated by, for example, modulating an impedance of the antenna 570 such that the modulation in impedance is detected by the external reader 580. The modulation in antenna impedance can be detected by, for example, backscatter radiation from the antenna 570.

In some embodiments, the system 500 can operate to non-continuously ("intermittently") supply energy to the eye-mountable device 510 to power the on-board controller 550 and electronics 560. For example, radio frequency radiation 571 can be supplied to power the eye-mountable device 510 long enough to carry out a tear film analyte concentration measurement and communicate the results. For example, the supplied radio frequency radiation can provide sufficient power to charge two electrodes to a potential sufficient to induce electrochemical reactions, measure the resulting amperometric current, and modulate the antenna impedance to adjust the backscatter radiation in a manner indicative of the measured current. In such an example, the supplied radio frequency radiation 571 can be considered an interrogation signal from the external reader 580 to the eye-mountable device 510 to request a measurement. By periodically interrogating the eye-mountable device 510 (e.g., by supplying radio frequency radiation 571 to temporarily turn the device on) and storing the sensor results (e.g., via the data storage 583), the external reader 580 can accumulate a set of analyte concentration measurements over time without continuously powering the eye-mountable device 510.

Figure 6A:
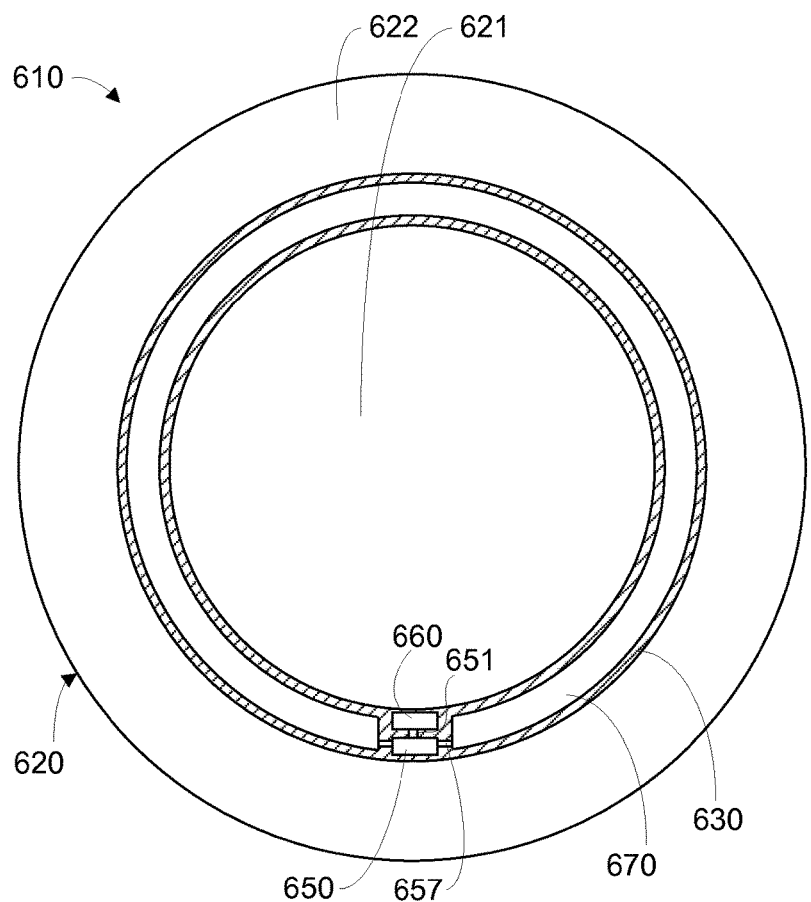
FIG. 6a is a top view of an eye-mountable device, according to an example embodiment.
Figure 6B:
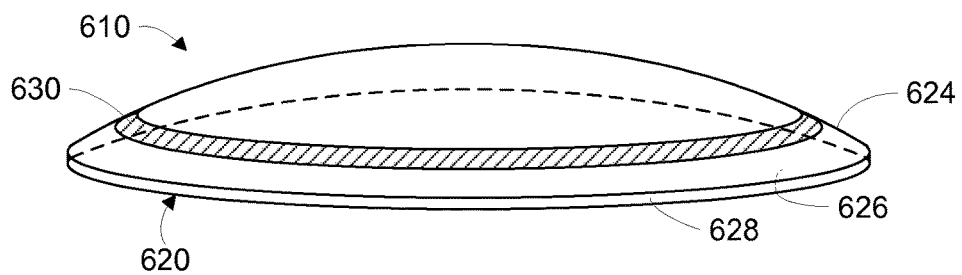
FIG. 6b is a side view of an eye-mountable device, according to an example embodiment.

FIG. 6a is a top view of an eye-mountable electronic device 610. FIG. 6b is a side view of the eye-mountable electronic device shown in FIG. 6a. It is noted that relative dimensions in FIGS. 6a and 6b are not necessarily to scale, but have been rendered for purposes of explanation only in describing the arrangement of the eye-mountable electronic device 610. The eye-mountable device 610 is formed of a polymeric material 620 shaped as a curved disk. The polymeric material 620 can be a substantially transparent material to allow incident light to be transmitted to the eye while the eye-mountable device 610 is mounted to the eye. The polymeric material 620 can be a biocompatible material similar to those employed to form vision correction and/or cosmetic contact lenses in optometry, such as PET, polymethyl methacrylate ("PMMA"), silicone hydrogels, combinations of these, etc. The polymeric material 620 can be formed with one side having a concave surface 626 suitable to fit over a corneal surface of an eye. The opposing side of the disk can have a convex surface 624 that does not interfere with eyelid motion while the eye-mountable device 610 is mounted to the eye. A circular outer side edge 628 connects the concave surface 624 and convex surface 626.

The eye-mountable device 610 can have dimensions similar to a vision correction and/or cosmetic contact lenses, such as a diameter of approximately 1 centimeter, and a thickness of about 0.1 to about 0.5 millimeters. However, the diameter and thickness values are provided for explanatory purposes only. In some embodiments, the dimensions of the eye-mountable device 610 can be selected according to the size and/or shape of the corneal surface and/or the scleral surface of the wearer's eye.

While the eye-mountable device 610 is mounted in an eye, the convex surface 624 (i.e., the anterior surface) faces outward to the ambient environment while the concave surface 626 (i.e., the posterior surface) faces inward, toward the corneal surface. The convex surface 624 can therefore be considered an outer, top surface of the eye-mountable device 610 whereas the concave surface 626 can be considered an inner, bottom surface. The "top" view shown in FIG. 6*a* is facing the convex surface 624.

A substrate 630 is embedded in the polymeric material 620. The substrate 630 can be embedded to be situated along the outer periphery 622 of the polymeric material 620, away from the center region 621. The substrate 630 does not interfere with vision because it is too close to the eye to be in focus and is positioned away from the center region 621 where incident light is transmitted to the light-sensing portions of the eye. Moreover, the substrate 630 can be formed of a transparent material to further mitigate any effects on visual perception.

The substrate 630 can be shaped as a flat, circular ring (e.g., a disk with a central hole). The flat surface of the substrate 630 (e.g., along the radial width) is a platform for mounting electronics such as chips (e.g., via flip-chip mounting) and for patterning conductive materials (e.g., via deposition techniques) to form electrodes, antenna(e), and/or connections. The substrate 630 and the polymeric material 620 can be approximately cylindrically symmetric about a common central axis. The substrate 630 can have, for example, a diameter of about 10 millimeters, a radial width of about 1 millimeter (e.g., an outer radius 1 millimeter greater than an inner radius), and a thickness of about 50 micrometers. However, these dimensions are provided for example purposes only. The substrate 630 can be implemented in a variety of different form factors.

A loop antenna 670, a controller 650, and bio-interactive electronics 660 are disposed on the embedded substrate 630. The controller 650 can be a chip including logic elements configured to operate the bio-interactive electronics 660 and the loop antenna 670. The controller 650 is electrically connected to the loop antenna 670 by interconnects 657 also situated on the substrate 630. Similarly, the controller 650 is electrically connected to the bio-interactive electronics 660 by interconnects 651. The interconnects 651, 657, the loop antenna 670, and any conductive electrodes (e.g., for an electrochemical analyte bio-sensor, etc.) can be formed from conductive materials patterned on the substrate 630 by a process for precisely patterning such materials, such as deposition or lithography. The conductive materials patterned on the substrate 630 can be, for example, gold, platinum, palladium, titanium, carbon, aluminum, copper, silver, silver-chloride, and/or other materials.

With reference to FIG. 6*a*, which is a view facing the convex surface 624 of the eye-mountable device 610, the bio-interactive electronics 660 is mounted to a side of the substrate 630 facing the convex surface 624. Where the bio-interactive electronics 660 includes an analyte bio-sensor, for example, mounting such a bio-sensor on the substrate 630 facing the convex surface 624 allows the bio-sensor to receive analyte concentrations in tear film through a channel 672 in the polymeric material 620 to the convex surface 624 (as illustrated in FIGS. 6*c* and 6*d*). In some embodiments, some electronic components can be mounted on one side of the substrate 630, while other electronic components are mounted to the opposing side, and connections between the two can be made through conductive materials passing through the substrate 630.

The loop antenna 670 is a layer of conductive material patterned along the flat surface of the substrate to form a flat conductive ring. In some instances, the loop antenna 670 can be formed without making a complete loop. For instance, the loop antenna 670 can have a cutout to allow room for the controller 650 and the bio-interactive electronics 660, as illustrated in FIG. 6*a*. However, the loop antenna 670 can also be arranged as a continuous strip of conductive material that wraps entirely around the flat surface of the substrate 630 one or more times. For example, a strip of conductive material with multiple windings can be patterned on the side of the substrate 630 opposite the controller 650 and bio-interactive electronics 660. Interconnects between the ends of such a wound antenna (e.g., the antenna leads) can be passed through the substrate 630 to the controller 650. In some embodiments, the loop antenna can include a plurality of conductive loops spaced apart from each other, such as three conductive loops, five conductive loops, nine conductive loops, etc. With such an arrangement, the polymeric material 620 may extend between adjacent conductive loops in the plurality of conductive loops.

FIG. 6*c* is a side cross-section view of the eye-mountable electronic device 610 while mounted to a corneal surface 684 of an eye 680. FIG. 6*d* is a close-in side cross-section view enhanced to show tear film layers 690, 692 surrounding the exposed surfaces 624, 626 of the eye-mountable device 610. It is noted that relative dimensions in FIGS. 6*c* and 6*d* are not necessarily to scale, but have been rendered for purposes of explanation only in describing the arrangement of the eye-mountable electronic device 610. For example, the total thickness of the eye-mountable device 610 can be about 200 micrometers, while the thickness of the tear film layers 690, 692 can each be about 10 micrometers, although this ratio may not be reflected in the drawings. Some aspects are exaggerated to allow for illustration and facilitate explanation.

The eye 680 includes a cornea 682 that is covered by bringing the upper eyelid 686 and lower eyelid 688 together over the top of the eye 680. Incident light is received by the eye 680 through the cornea 682, where light is optically directed to light sensing elements of the eye 680 (e.g., rods and cones, etc.) to stimulate visual perception. The motion of the eyelids 686, 688 distributes a tear film across the exposed corneal surface 684 of the eye 680. The tear film is an aqueous solution secreted by the lacrimal gland to protect and lubricate the eye 680. When the eye-mountable device 610 is mounted in the eye 680, the tear film coats both the convex and concave surfaces 624, 626 with an inner layer 690 (along the concave surface 626) and an outer layer 692 (along the convex layer 624). The tear film layers 690, 692 can be about 10 micrometers in thickness and together account for about 10 microliters.

The tear film layers 690, 692 are distributed across the corneal surface 684 and/or the convex surface 624 by motion of the eyelids 686, 688. For example, the eyelids 686, 688 raise and lower, respectively, to spread a small volume of tear film across the corneal surface 684 and/or the convex surface 624 of the eye-mountable device 610. The tear film layer 690 on the corneal surface 684 also facilitates mounting the eye-mountable device 610 by capillary forces between the concave surface 626 and the corneal surface 684. In some embodiments, the eye-mountable device 610 can also be held over the eye in part by vacuum forces against the corneal surface 684 due to the concave curvature of the eye-facing concave surface 626.

As shown in the cross-sectional views in FIGS. 6c and 6d, the substrate 630 can be inclined such that the flat mounting surfaces of the substrate 630 are approximately parallel to the adjacent portion of the convex surface 624. As described above, the substrate 630 is a flattened ring with an inward-facing surface 632 (facing the concave surface 626 of the polymeric material 620) and an outward-facing surface 634 (facing the convex surface 624). The substrate 630 can have electronic components and/or patterned conductive materials mounted to either or both mounting surfaces 632, 634.

As shown in FIG. 6d, the bio-interactive electronics 660, the controller 650, and the conductive interconnect 651 are located between the outward-facing surface 634 and the inward-facing surface 632 such that the bio-interactive electronics 660 are facing the convex surface 624. As described above, the polymer layer defining the anterior side may be greater than 50 micrometers thick, whereas the polymer layer defining the posterior side may be less than 150 micrometers. Thus, the bio-interactive electronics 660 may be at least 50 micrometers away from the convex surface 624 and may be a greater distance away from the concave surface 626. However, in other examples, the bio-interactive electronics 660 may be mounted on the inward-facing surface 632 of the substrate 630 such that the bio-interactive electronics 660 are facing the concave surface 626. The bio-interactive electronics 660 could also be positioned closer to the concave surface 626 than the convex surface 624. With this arrangement, the bio-interactive electronics 660 can receive analyte concentrations in the tear film 692 through the channel 672.

While the body-mountable device has been described as comprising the eye-mountable device 510 and/or the eye-mountable device 610, the body-mountable device could comprise other mountable devices that are mounted on or in other portions of the body.

As noted, in some embodiments, the body-mountable device may comprise a tooth-mountable device. In some embodiments, the tooth-mountable device may take the form of or be similar in form to the eye-mountable device 510 and/or the eye-mountable device 610. For instance, the tooth-mountable device may include a polymeric material that is the same or similar to any of the polymeric materials described herein and a substrate that is the same or similar to any of the substrates described herein.

As noted, in some embodiments, the body-mountable device may comprise a skin-mountable device. In some embodiments, the skin-mountable device may take the form of or be similar in form to the eye-mountable device 510 and/or the eye-mountable device 610. For instance, the skin-mountable device may include a polymeric material that is the same or similar to any of the polymeric materials described herein and a substrate that is the same or similar to any of the substrates described herein.

V. CONCLUSION

It should be understood that arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

Where example embodiments involve information related to a person or a device of a person, some embodiments may include privacy controls. Such privacy controls may include, at least, anonymization of device identifiers, transparency and user controls, including functionality that would enable users to modify or delete information relating to the user's use of a product.

Further, in situations where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The invention claimed is:

1. A method for fabricating a body-mountable device, the method comprising:

forming a first polymer layer between a first molding piece and a second molding piece, wherein the first molding piece and the second molding piece combine to form a mold cavity, wherein the first molding piece has a first surface layer, the second molding piece has a second surface layer, and at least one of the first or second surface layers facilitates release of the first polymer layer from at least one of the first or second molding piece, and wherein the first polymer layer defines a first side of the body-mountable device;

releasing the first polymer layer from at least one of the first or second molding piece;

after releasing the first polymer layer from at least one of the first or second molding piece, positioning a structure on the first polymer layer, wherein the structure comprises at least one sensor configured to detect an analyte; and forming a second polymer layer between the first polymer layer and a third molding piece, such that the structure is at least partially enclosed by the first polymer layer and the second polymer layer, wherein the third molding piece has a third surface layer that facilitates release of the second polymer layer from the third molding piece, and wherein the second polymer layer defines a second side of the body-mountable device.

2. The method of claim 1, wherein at least one of the first, second or third surface layers comprises a silane.

3. The method of claim 2, wherein the silane has the structure of formula I:

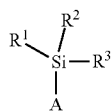
(I)

wherein

A is an atom on the surface of the molding piece; and $R^1$, $R^2$ and $R^3$ are each hydrogen, halogen, alkyl, alkenyl, alkoxy, haloalkyl, haloalkoxy, cycloalkyl, phenyl, halophenyl or -A.

4. The method of claim 1, wherein at least one of the surface layers comprises a water-soluble polymer.

5. The method of claim 4, wherein the water-soluble polymer comprises a polysaccharide, poly(acrylic acid), dextran, poly(methacrylic acid), poly(acrylamide), poly(ethylene imine), poly(vinyl alcohol), poly(ethylene oxide), poly(ethylene oxide), chitosan, sucrose, or a copolymer thereof.

6. The method of claim 1, wherein at least one of the surface layers comprises a surfactant.

7. The method of claim 6, wherein the surfactant is glycerol monostearate, glycerol distearate, glycerol tristearate or a combination thereof.

8. The method of claim 4, further comprising contacting the at least one of the surface layers with an aqueous solution.

9. The method of claim 6, further comprising contacting the at least one of the surface layers with an aqueous solution.

10. The method of claim 1, further comprising forming a channel to the sensor through the second polymer layer.

* * * * *